United States Patent
Andrada et al.

(10) Patent No.: US 9,253,439 B2
(45) Date of Patent: Feb. 2, 2016

(54) MANAGING COMPLEX VIDEO CALL SCENARIOS IN VOLTE CALLS

(71) Applicant: Cellco Partnership, Basking Ridge, NJ (US)

(72) Inventors: Mauricio Pati Caldeira de Andrada, South Plainfield, NJ (US); Muhammad Salman Nomani, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 68 days.

(21) Appl. No.: 14/187,538

(22) Filed: Feb. 24, 2014

(65) Prior Publication Data

US 2015/0244979 A1    Aug. 27, 2015

(51) Int. Cl.
  *H04N 7/14*    (2006.01)
  *H04L 12/66*   (2006.01)
  *H04L 29/06*   (2006.01)

(52) U.S. Cl.
  CPC ............ *H04N 7/148* (2013.01); *H04L 65/1006* (2013.01); *H04L 65/1046* (2013.01); *H04L 65/1059* (2013.01); *H04L 65/1083* (2013.01); *H04L 65/1096* (2013.01); *H04N 7/147* (2013.01)

(58) Field of Classification Search
  CPC .. H04M 1/575; H04M 1/663; H04N 21/2187; H04N 21/4122; H04N 21/4223
  USPC .......... 348/14.01, 14.03, 14.04, 14.07, 14.11, 348/14.12, 14.05; 370/356, 352
  See application file for complete search history.

(56) References Cited

U.S. PATENT DOCUMENTS

| | | | | |
|---|---|---|---|---|
| 6,978,310 | B1 * | 12/2005 | Rodriguez | ......... H04N 21/4312 348/14.07 |
| 7,142,230 | B2 * | 11/2006 | Novak | ............. H04L 29/06027 348/14.01 |
| 7,577,429 | B2 * | 8/2009 | Bear | ..................... H04M 1/575 379/90.01 |
| 2006/0098634 | A1 * | 5/2006 | Umemoto et al. | ............ 370/352 |
| 2008/0037741 | A1 * | 2/2008 | Bear | ..................... H04M 1/575 379/142.01 |
| 2009/0305695 | A1 * | 12/2009 | Bear | ..................... H04M 1/575 455/426.1 |
| 2012/0287220 | A1 * | 11/2012 | Ravi et al. | ................... 348/14.02 |
| 2013/0124659 | A1 * | 5/2013 | Chaturvedi et al. | ........... 709/206 |
| 2015/0029303 | A1 * | 1/2015 | Lee | ........................ H04N 7/147 348/14.12 |

OTHER PUBLICATIONS

Rosenberg et al., "An Offer/Answer Model with the Session Description Protocol (SDP)", https://www.ietf.org/rfc/rfc3264.txt, Jun. 2002, 25 pages.

* cited by examiner

*Primary Examiner* — Binh Tieu

(57) ABSTRACT

A device may determine to adjust from a first state for an existing communication between the device and another device. The first state may be associated with utilizing a first audio and/or video configuration for communication. The device may determine a second state associated with a second audio and/or video configuration for the communication. The second audio and/or video configuration may be different from the first audio and/or video configuration. The device may provide state information associated with the second audio and/or video configuration via a first session initiation protocol message. The first session initiation protocol message may include directionality information associated with the second audio and/or video configuration. The device may receive confirmation information via a second session initiation protocol message based on providing the state information. The device may adjust from the first state to the second state, during the communication, based on receiving the confirmation information.

20 Claims, 18 Drawing Sheets

FIG. 7B

MANAGING COMPLEX VIDEO CALL SCENARIOS IN VOLTE CALLS

BACKGROUND

A communication between a first user device and a second user device may be associated with a particular state, such as a one-way video call state, a two-way video call state, an inactive state, a hold state, or the like. A session initiation protocol (SIP) message may be utilized for establishing one or more initial audio and/or video parameters associated with the communication.

BRIEF DESCRIPTION OF THE DRAWINGS

FIGS. 7A and 7B are diagrams of an example data structure that stores state transition information associated with facilitating a change of state associated with a communication.

DETAILED DESCRIPTION OF PREFERRED EMBODIMENTS

The following detailed description of example implementations refers to the accompanying drawings. The same reference numbers in different drawings may identify the same or similar elements.

A first user device may communicate, such as via an audio communication, a video communication, an audio-video communication, or the like, with a second user device via a network. The first user device may store state information associated with an audio and/or video configuration of the second user device, and may utilize the stored state information for configuring a change of the state of the communication. However, configuring the change of state of the communication (e.g., changing an audio directionality, changing a video directionality, etc.) based on stored state information may result in increased complexity, as well as errors associated with a lack of synchronization for the state information. Implementations described herein may facilitate a change of state for a first user device communicating with a second user device, without the first user device maintaining information regarding a state associated with the second user device, by providing state information via SIP messaging including session description protocol (SDP) information during the change of state.

Figure 1A:
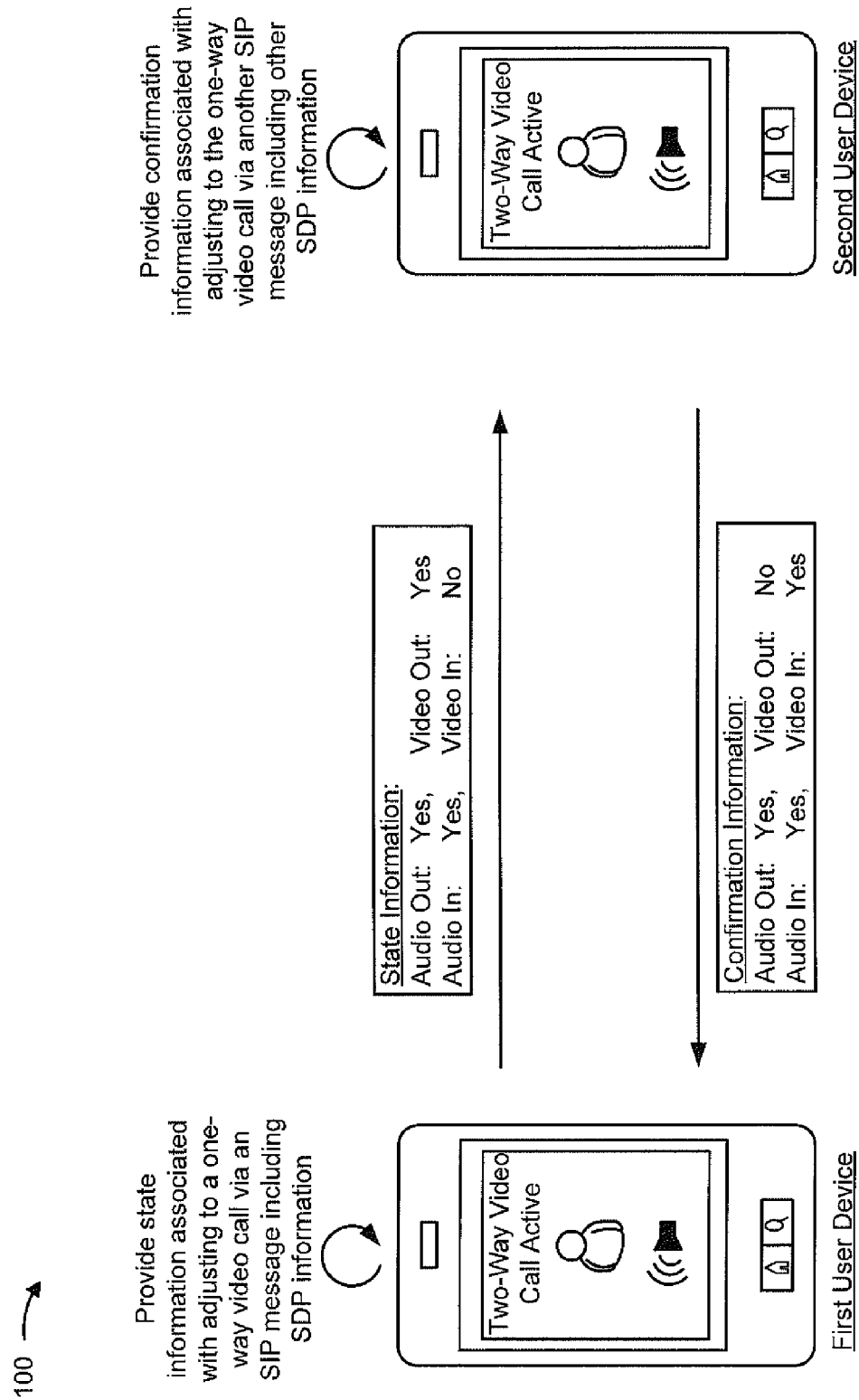
FIGS. 1A and 1B are diagrams of an overview of an example implementation described herein.
Figure 1B:
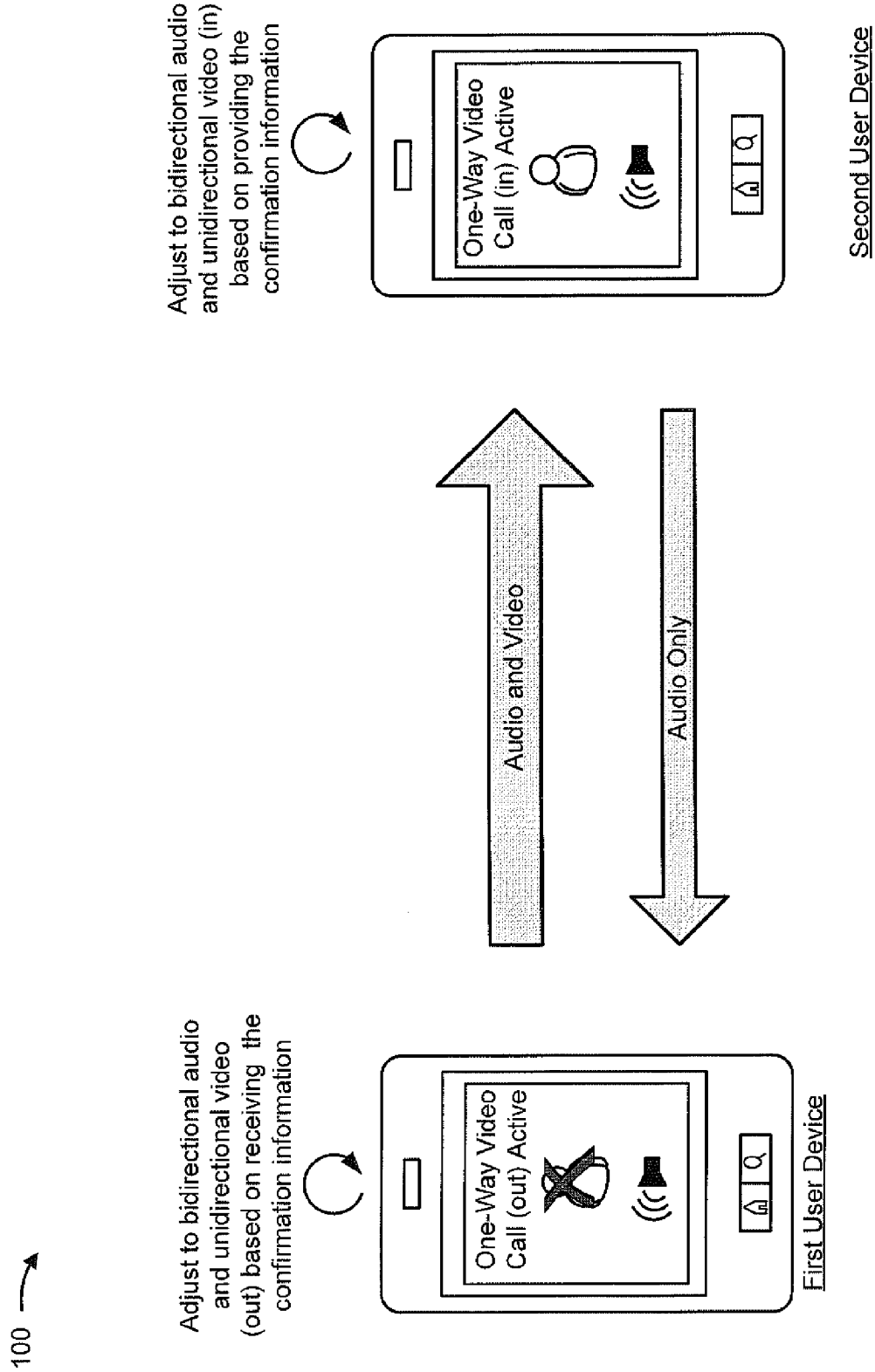

FIGS. 1A and 1B are diagrams of an overview of an example implementation 100 described herein. Example implementation 100 may include a first user device and a second user device. As shown in FIG. 1A, the first user device may communicate with the second user device (e.g., via a voice over long term evolution (VoLTE) communication). The communication may be associated with a particular state (e.g., a particular communication configuration associated with a particular audio directionality, a particular video directionality, a particular screen view, etc.), such as a voice call state, a two-way video call state, a one-way video call (out) state, a one-way video call (in) state, or the like. A first user of the first user device may determine to change a communication configuration associated with the first user device to adjust from a first state to a second state. For example, the first user may determine to adjust the communication configuration associated with the first user device from a first communication configuration associated with providing two-way video calling (e.g., the first state) to a second communication configuration associated with providing one-way video calling (out) (e.g., the second state).

The first user device may provide state information indicating the second state (e.g., the second state to which the first user device is to adjust) to the second user device via an SIP message (e.g., an SIP invite message including SDP information). For example, the state information associated with the one-way video call (out) second state may include information indicating bidirectional audio communication and unidirectional video communication (out) for the first user device. The second user device may determine a corresponding second state for the second user device (e.g., a one-way video call (in) second state), and may provide confirmation information via another SIP message (e.g., an SIP reply message including SDP information). For example, the confirmation information associated with the one-way video call (in) second state may include information indicating bidirectional audio communication and unidirectional video communication (in) for the second user device.

As shown in FIG. 1B, the second user device may adjust a communication configuration associated with the second user device based on providing the confirmation information. For example, the second user device may adjust from bidirectional audio communication and bidirectional video communication (e.g., the two-way video call first state for the second device) to bidirectional audio communication and unidirectional video communication (in) (e.g., the one-way video call (in) second state for the second device). The first user device may adjust the communication configuration associated with the first user device based on providing the state information and/or receiving the confirmation information. For example, the first user device may adjust from bidirectional audio communication and bidirectional video communication (e.g., the two-way video call first state for the first user device) to bidirectional audio communication and unidirectional video communication (out) (e.g., the one-way video call (out) second state for the first user device).

Based on adjusting the audio and/or video configuration associated with the first user device, the first user device may provide audio and video to, and may receive audio from the second user device. Based on adjusting the communication configuration associated with the second user device, the second user device may provide audio to, and may receive audio and video from the first user device. In this way, a first user device may provide state information, during a communication with a second user device, to facilitate a change to a new call state without maintaining information regarding a previous call state, and may receive confirmation information associated with confirming the change to the new call state.

Figure 2:
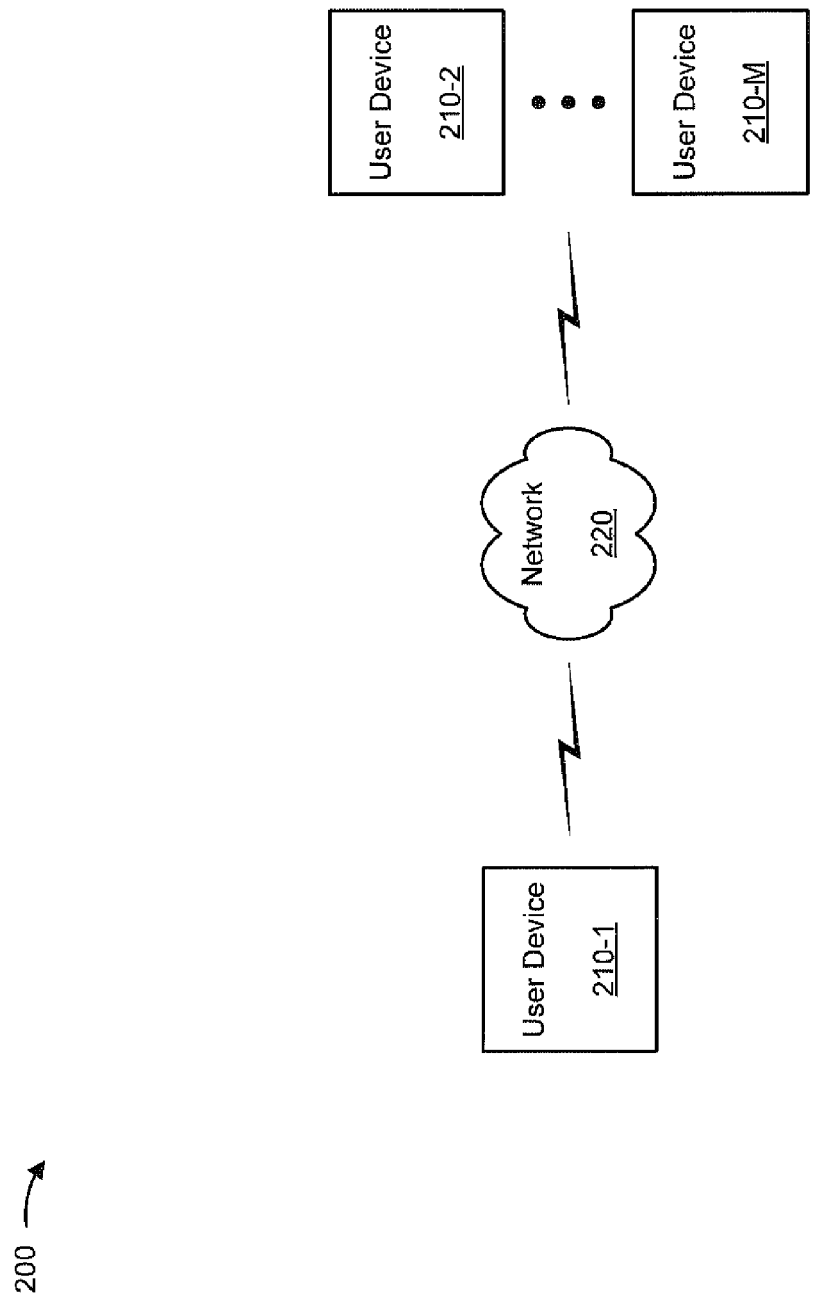
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 to 210-M (M>1) (hereinafter referred to collectively as "user devices 210," and individually as "user device 210") and network 220. Devices of environment 200 may interconnect via wired connections, wireless connections, or a combination of wired and wireless connections.

User device 210 may include one or more devices capable of receiving, generating, processing, storing, and/or providing audio and/or video communication. For example, user device 210 may include a mobile phone (e.g., a smart phone), a radiotelephone, a video phone, a personal communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a video game console, a set-top box, or a similar type of device. In some implementations, user device 210 may provide audio and/or video communication with another user device 210 via a VoLTE communication. In some implementations, user device 210 may utilize a particular communication protocol message, such as an SIP message (e.g., that includes SDP information) or the like, to provide information associated with a change of state of the audio and/or video communication. SDP information may refer to attribute information associated with identifying a particular directionality associated with a communication. For example, SDP information may indicate a particular directionality associated with a particular media, such as an audio directionality, a video directionality, etc. SDP information may be conveyed via an SIP message. In some implementations, user device 210 may communicate with a set of other user devices 210 (e.g., via a set of direct connections, via a conference calling server, etc.).

Network 220 may include one or more wired and/or wireless networks. For example, network 220 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
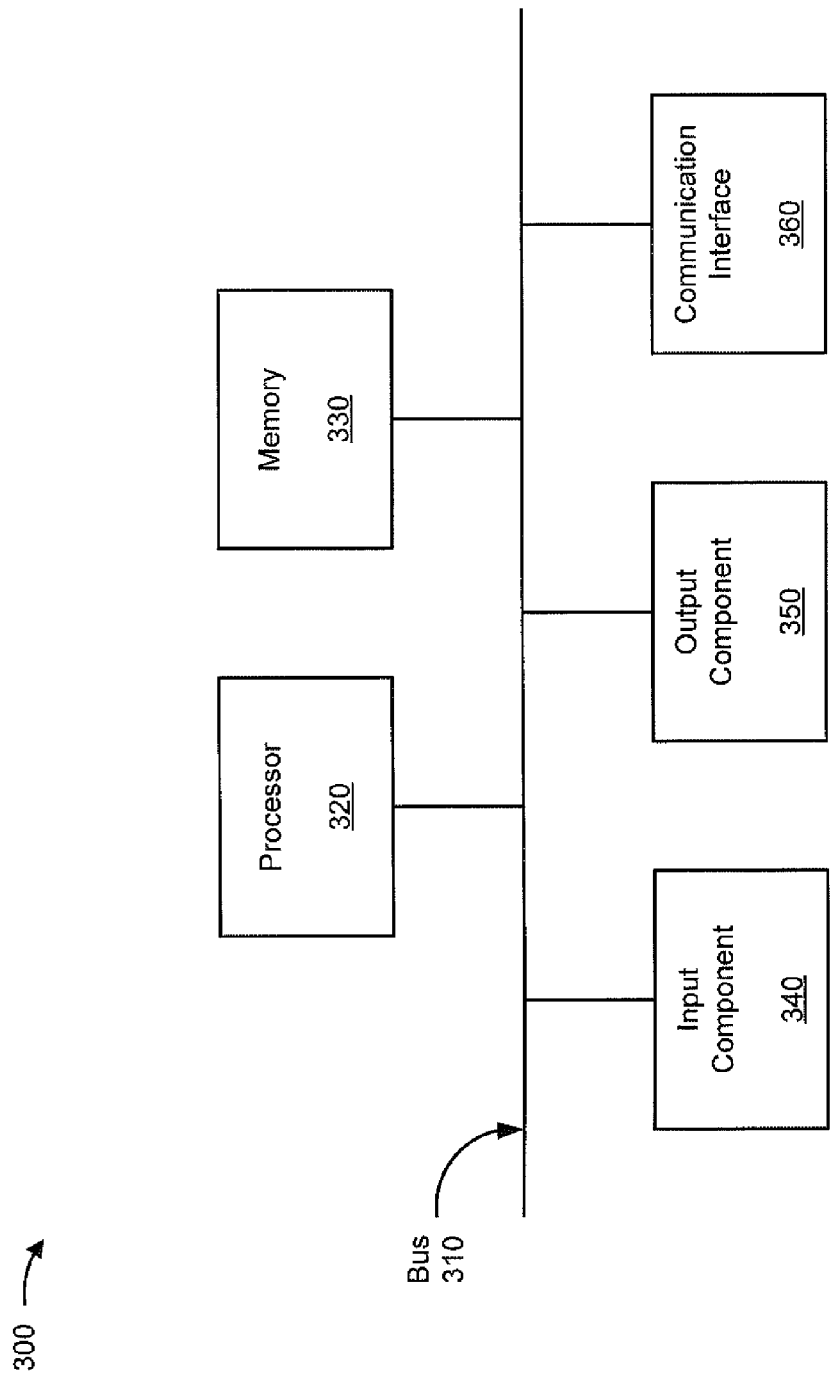
FIG. 3 is a diagram of example components of one or more devices of FIG. 2.

FIG. 3 is a diagram of example components of a device 300. Device 300 may correspond to user device 210. In some implementations, user device 210 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
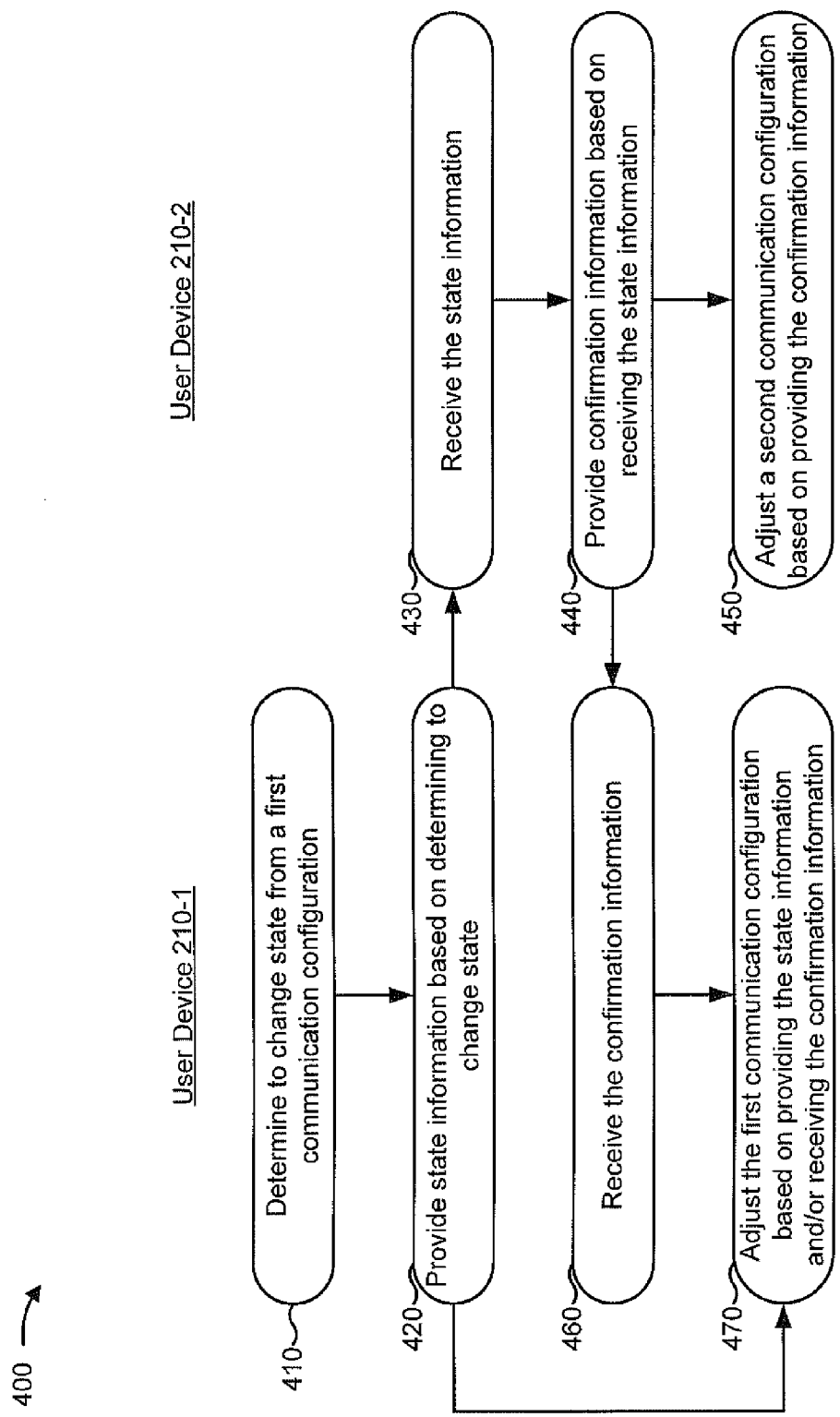
FIG. 4 is a flow chart of an example process for facilitating a change of state associated with a communication.

FIG. 4 is a flow chart of an example process for facilitating a change of state associated with a communication. In some implementations, one or more process blocks of FIG. 4 may be performed by user device 210-1 and/or user device 210-2. Additionally, or alternatively, one or more process blocks of FIG. 4 may be performed by another device or a group of devices separate from or including user device 210-1 and/or user device 210-2, such as a server device, a router device, a base station device, a video and/or audio call conferencing device, or the like. Assume that user device 210-1 is utilizing a first communication configuration for an existing communication with user device 210-2. Assume that user device 210-2 is utilizing a second communication configuration for the existing communication with user device 210-1.

As shown in FIG. 4, process 400 may include determining to change state from a first communication configuration (block 410). For example, user device 210-1 may determine to change from a first state associated with a first communication configuration to a second state. A state may refer to a particular communication configuration for a particular user device 210 that may include a set of audio and/or video parameters (e.g., a directionality parameter associated with an audio communication, a directionality parameter associated with a video communication, etc.), a set of screen view parameters, (e.g., a parameter associated with displaying a video communication, a parameter associated with displaying a web browser, etc.), or the like. For example, a voice call state may be associated with a communication configuration for providing bidirectional audio communication).

Additionally, or alternatively, a particular communication configuration may be associated with providing a one-way video call (out) state (e.g., a communication configuration for bidirectional audio communication and providing unidirectional video communication), a one-way video call (in) state (e.g., a communication configuration for bidirectional audio communication and receiving unidirectional video communication), a two-way video call state (e.g., a communication configuration for bidirectional audio communication and bidirectional video communication), a call waiting state (e.g., a communication configuration for providing unidirectional audio), an on hold state (e.g., a communication configuration for receiving unidirectional audio communication), an on pause state (e.g., a communication configuration for bidirectional audio communication, and associated with a screen view parameter for paused video playback), a multitasking state (e.g., a communication configuration for bidirectional audio communication, and associated with a screen view parameter for a browser view, an application view, etc.), or the like.

Additionally, or alternatively, a state may be associated with a corresponding other state. For example, when user device 210-1 utilizes a one-way video call (out) state, user device 210-2 may utilize a corresponding one-way video call (in) state. Additionally, or alternatively, when user device 210-1 utilizes a call waiting state, user device 210-2 may utilize a corresponding on hold state.

User device 210-1 may determine the second state associated with a second communication configuration for user device 210-1 when determining to change state, in some implementations. For example, user device 210-1 may determine a two-way video call second state to which to adjust from a voice call first state. In some implementations, user device 210-1 may determine the second state based on user interaction. For example, when user device 210-1 is associated with a two-way video call first state, a user of user device 210-1 may determine to utilize a mobile internet browser during the communication with user device 210-2. In this case, user device 210-1 may select a multitasking second state to facilitate browsing and to maintain bidirectional audio communication. Additionally, or alternatively, user device 210-1 may determine the second state based on receiving information from user device 210-2. For example, when user device 210-1 receives information requesting adjustment to a particular second state from user device 210-2 and does not confirm the particular second state, user device 210-1 may determine another particular second state based on the particular second state.

As further shown in FIG. 4, process 400 may include providing state information based on determining to change state (block 420). For example, user device 210-1 may provide state information associated with the second state and/or the first state. State information may refer to information regarding an adjustment to a particular state (e.g., a particular communication configuration), and may include a particular first state, a particular second state, a particular communication configuration (e.g., a particular audio and/or video configuration associated with the particular first state, the particular second state, etc.), or the like. For example, user device 210-1 may provide state information indicating that the second state for user device 210-1 is to be a two-way video call state. Additionally, or alternatively, user device 210-1 may provide state information including a set of states for selection. For example, user device 210-1 may provide state information indicating that user device 210-1 may change state to a two-way video call state or a one-way video call (out) state. In this case, user device 210-1 may adjust the communication configuration associated with user device 210-1 based on receiving a selection of a particular state (e.g., of the set of states indicated in the state information) from user device 210-2.

User device 210-1 may provide the state information utilizing an SIP message, in some implementations. For example, user device 210-1 may provide a particular SIP message indicating an invitation (INV) (e.g., an SIP INVITE and/or SIP re-INVITE message) for a particular directionality of an audio and/or video communication (e.g., a particular communication configuration associated with the second state), such as a send/receive (SR) (e.g., SDP "sendrecv") message (e.g., indicating bidirectional communication), a send only (SO) (e.g., SDP "sendonly") message (e.g., indicating providing unidirectional communication), a receive only (RO) (e.g., SDP "recvonly") message (e.g., indicating receiving unidirectional communication), an inactive (IN) (e.g., SDP "inactive") message (e.g., indicating inactive communication), a multi-modal message (XX) (e.g., indicating that a media directionality may be SR, SO, RO, IN, etc. based on a camera state (on/off), a microphone state (on/off), etc. thereby facilitating selection of the media directionality via a confirmation message when transitioning from a call waiting call state, a multitasking call state, etc.), a media-non-inclusion message (--) (e.g., indicating that a particular media, such as audio, video, etc., is not to be included in a call state, such as a voice call state, etc.), or the like, as further described herein with respect to FIGS. 7A and 7B.

In some implementations, user device 210-1 may provide a first SIP message including first SDP information associated with an audio configuration, and may provide a second SIP message including second SDP information associated with a video configuration. An SIP message including SDP information may refer to an SIP message (e.g., an SIP INVITE message, an SIP 200 OK message, etc.) conveying information associated with a media directionality, such as an audio directionality, a video directionality, or the like. Additionally, or alternatively, user device 210-1 may provide a particular SIP message including SDP information describing an audio configuration and a video configuration. For example, user device 210-1 may provide an SR/SR (e.g., "INV: SR/SR," an SIP INVITE with SDP "sendrecv" audio and an SDP "sendrecv" video) message (e.g., indicating bidirectional audio communication and bidirectional video communication, such as for a two-way video call state, etc.), an SR/SO (e.g., "INV: SR/SO," an SIP INVITE with SDP "sendrecv" audio and an SDP "sendonly" video) message (e.g., indicating bidirectional audio communication and providing unidirectional video communication, such as for a one-way video call (out) state, etc.), an RO/IN message (e.g., indicating receiving unidirectional audio and inactive video, such as for an on hold state, etc.), or the like, as further described herein with respect to FIGS. 7A and 7B.

User device 210-1 may determine an SIP message including SDP information associated with the state information that is to be provided based on accessing a data structure storing SDP identifiers (e.g., a set of identifiers associated with a media directionality attribute), in some implementations. For example, user device 210-1 may utilize a local data structure storing a set of SDP identifiers associated with particular communication configurations for particular states.

User device 210-1 may provide the state information to user device 210-2 (e.g., via network 220), in some implementations. For example, when user device 210-1 communicates with user device 210-2, user device 210-1 may provide the state information to user device 210-2 to facilitate changing state. Additionally, or alternatively, user device 210-1 may provide the state information to a set of user devices 210-2. For example, when user device 210-1 communicates with first user device 210-2 and second user device 210-2, user device 210-1 may provide the state information to first user device 210-2 and second user device 210-2 (e.g., via a set of direct SIP messages including SDP information, via an SIP message including SDP information to a conference calling server, etc.).

As further shown in FIG. 4, process 400 may include receiving the state information (block 430). For example, user device 210-2 may receive the state information. In some implementations, user device 210-2 may receive the state information from user device 210-1 (e.g., via network 220). Additionally, or alternatively, when user device 210-2 is communicating with one or more user devices 210-1, user device 210-2 may receive the state information via a conference calling server. In some implementations, user device 210-2 may receive the state information based on monitoring a particular port associated with receiving SIP messages (e.g., including SDP information). For example, user device 210-2 may receive an SIP message via the particular port, and may determine that the SIP message includes SDP information conveying the state information.

As further shown in FIG. 4, process 400 may include providing confirmation information based on receiving the state information (block 440). For example, user device 210-2 may provide the confirmation information based on receiving the state information. Confirmation information may refer to information associated with confirming the change to the second state for user device 210-1. For example, confirmation information may include a particular first state for user device 210-2, a particular second state for user device 210-2, or the like.

In some implementations, when user device 210-2 receives state information associated with user device 210-1 changing to a particular second state, user device 210-2 may provide confirmation information associated with indicating that user device 210-2 is changing to a corresponding second state. For example, when user device 210-2 receives state information indicating that user device 210-1 is to change from a two-way video call state to a one-way video call (in) state, user device 210-2 may provide confirmation information indicating that user device 210-2 is to change from the two-way video call state to a corresponding one-way video call (out) state.

User device 210-2 may provide confirmation information counter-indicating a different second state for user device 210-1 from the second state for user device 210-1 indicated by the state information, in some implementations. For example, when user device 210-1 provides state information indicating an adjustment from a voice call state to a two-way video call second state, user device 210-2 may reject the two-way video call second state, and may determine to change to a one-way video call (out) state. In this case, user device 210-2 may provide confirmation information counter-indicating the one-way video call (out) second state for user device 210-2 (e.g., corresponding to a one-way video call (in) second state for user device 210-1). In some implementations, user device 210-2 may request additional confirmation information from user device 210-1 when providing counter-indicating confirmation information.

User device 210-2 may provide confirmation information selecting a particular second state from a set of second states, in some implementations. For example, when user device 210-2 receives information indicating a selection of a two-way video call second state or a one-way video call (in) second state for user device 210-1, user device 210-2 may provide confirmation information associated with selecting the two-way video call second state for user device 210-1.

User device 210-2 may determine the confirmation information to be provided based on user feedback, in some implementations. For example, when the state information received from user device 210-1 includes a set of second states, user device 210-2 may provide the set of second states to the user of user device 210-2 for selection. Additionally, or alternatively, user device 210-2 may select a particular second state based on accessing a set of stored user preferences.

User device 210-2 may provide the confirmation information utilizing an SIP message, in some implementations. For example, user device 210-2 may provide a particular SIP message indicating confirmation (e.g., an SIP okay message "200," such as an SIP 200 OK response to an SIP INVITE and/or an SIP re-INVITE), such as an SR/SR message (e.g., "200: SR/SR" corresponding to confirming a two-way video call state), an SR/SO message (e.g., "200: SR/SO" corresponding to confirming a one-way video call (out) state), an SR/0 (e.g., "200: SR/0" corresponding to confirming a two-way audio call state and rejecting video transmission), or the like, as further described herein with respect to FIGS. 7A and 7B.

User device 210-2 may determine the confirmation information to be provided based on a data structure storing SDP identifiers, in some implementations. For example, user device 210-2 may access a data structure storing a set of SDP identifiers indicating particular confirmation information. In this case, user device 210-2 may utilize the data structure to determine a set of SIP messages including SDP information that correspond to the SIP message (e.g., the SIP INV message) provided by user device 210-1, and may select one of the set of SIP messages.

User device 210-2 may provide the confirmation information to user device 210-1 (e.g., via network 220), in some implementations. For example, when user device 210-2 communicates with user device 210-1, user device 210-2 may provide the confirmation information (e.g., via an SIP 200 message) to user device 210-1 to facilitate confirming the change of state. Additionally, or alternatively, user device 210-2 may provide the confirmation information to multiple other user devices 210 (e.g., via a conference calling server).

As further shown in FIG. 4, process 400 may include adjusting a second communication configuration based on providing the confirmation information (block 450). For example, user device 210-2 may adjust the second communication configuration (e.g., a particular communication configuration that is associated with user device 210-2) based on providing the confirmation information to user device 210-1. In some implementations, when adjusting the second communication configuration associated with user device 210-2, user device 210-2 may activate a camera, deactivate the camera, activate a microphone, deactivate the microphone, activate a communication interface associated with the camera, or the like. For example, when user device 210-2 is utilizing a voice call first state and adjusts to a one-way video call (out) second state, user device 210-2 may activate a particular video camera associated with user device 210-2, and may activate an output interface associated with providing video. In some implementations, when user device 210-2 is communicating with user device 210-1 (e.g., a particular communication) and user device 210-3 (e.g., another communication), user device 210-2 may adjust to the second state for the particular communication with user device 210-1, and may maintain the first state for the other communication with user device 210-3.

In some implementations, user device 210-2 may adjust a screen view when adjusting the second communication configuration. For example, when user device 210-2 is utilizing a two-way video call first state and adjusts to an on hold second state, user device 210-2 may adjust the screen view to eliminate a video viewing portion of the screen view.

User device 210-2 may provide a notification to a user when adjusting the second communication configuration, in some implementations. For example, when user device 210-2 activates a camera associated with user device 210-2, user device 210-2 may provide feedback to a user indicating that the camera is activated, such as via a pop-up notification, an indicator light, a haptic indicator, an audible notification, or the like.

As further shown in FIG. 4, process 400 may include receiving the confirmation information (block 460). For example, user device 210-1 may receive the confirmation information from user device 210-2 (e.g., via network 220). Additionally, or alternatively, user device 210-1 may receive the confirmation information via a conference calling server. In some implementations, user device 210-1 may receive the confirmation information based on monitoring a particular port associated with receiving SIP messages. For example, user device 210-1 may receive an SIP message (e.g., an SIP 200 message including SDP information) via the particular port, and may determine that the SIP message includes SDP information conveying the confirmation information.

As further shown in FIG. 4, process 400 may include adjusting the first communication configuration based on providing the state information and/or receiving the confirmation information (block 470). For example, user device 210-1 may adjust the first communication configuration (e.g., a particular communication configuration that is associated with user device 210-1) based on providing the state information to user device 210-2 and/or receiving the confirmation information from user device 210-2.

In some implementations, user device 210-1 may adjust the first communication configuration to a particular second state indicated in the state information. For example, user device 210-1 may indicate a particular second state in the state information, and may adjust the first communication configuration to the particular second state. Additionally, or alternatively, user device 210-1 may adjust the first communication configuration to a particular second state corresponding to the second state for user device 210-2 indicated in the confirmation information. For example, when user device 210-2 confirms a one-way video call (out) second state, user device 210-1 may adjust to the corresponding one-way video call (in) second state.

In some implementations, user device 210-1 may provide another set of messages associated with changing state when adjusting the first communication configuration. For example, when user device 210-1 is utilizing a two-way video call state for a first communication with user device 210-2 and receives a second communication (e.g., from user device 210-3), user device 210-1 may first adjust to a multitask state for the first communication (e.g., to facilitate providing information regarding the second communication to a user). In this case, when the user accepts the second communication, user device 210-1 may adjust to a call waiting state for the first communication with user device 210-2.

User device 210-1 may adjust a screen view for user device 210-1 when adjusting the first communication configuration, in some implementations. For example, when user device 210-1 is utilizing a two-way video call first state and adjusts to a multitasking second state, user device 210-1 may adjust the screen view for user device 210-1 to remove video playback, and may adjust the screen view for user device 210-1 to provide a browser, a game, a text editor, an application, or the like.

In this way, a first user device may facilitate a change of state, without maintaining information regarding a state associated with a second user device, based on SIP messaging of configuration information with the second user device.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
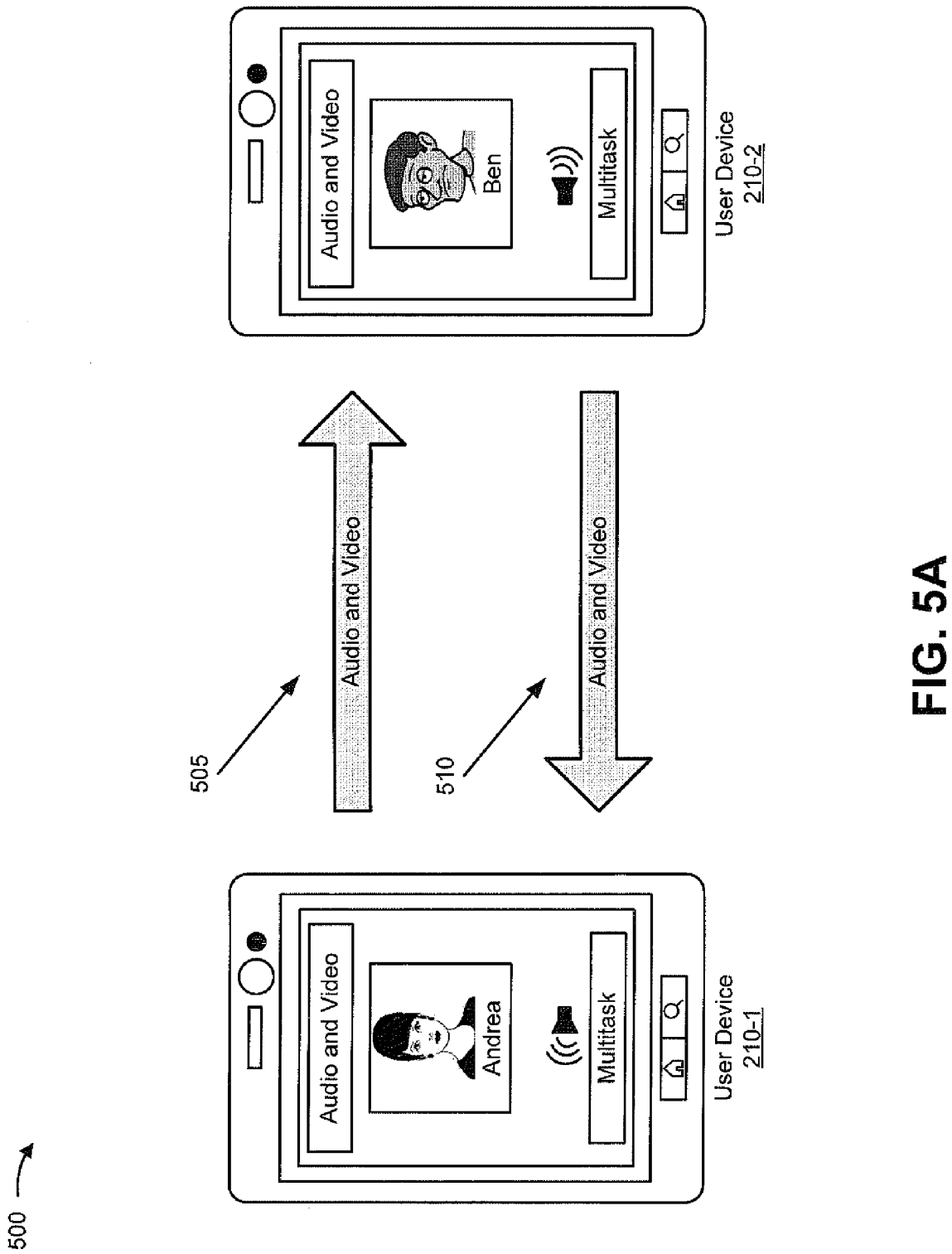
FIGS. 5A-5E are diagrams of an example implementation relating to the example process shown in FIG. 4.

FIGS. 5A-5E are diagrams of an example implementation 500 relating to process 400 shown in FIG. 4. As shown in FIG. 5A, example implementation 500 includes user device 210-1 and user device 210-2. Assume that user device 210-1 is associated with a first user (e.g. "Ben," visible via video communication with user device 210-2) and user device 210-2 is associated with a second user (e.g., "Andrea," visible via video communication with user device 210-1). As shown by reference number 505, user device 210-1 is providing audio and video communication to user device 210-2, and as shown by reference number 510, user device 210-2 is providing audio communication and video communication to user device 210-1 (e.g., user device 210-1 and user device 210-2 are associated with a two-way video call state).

Figure 5B:
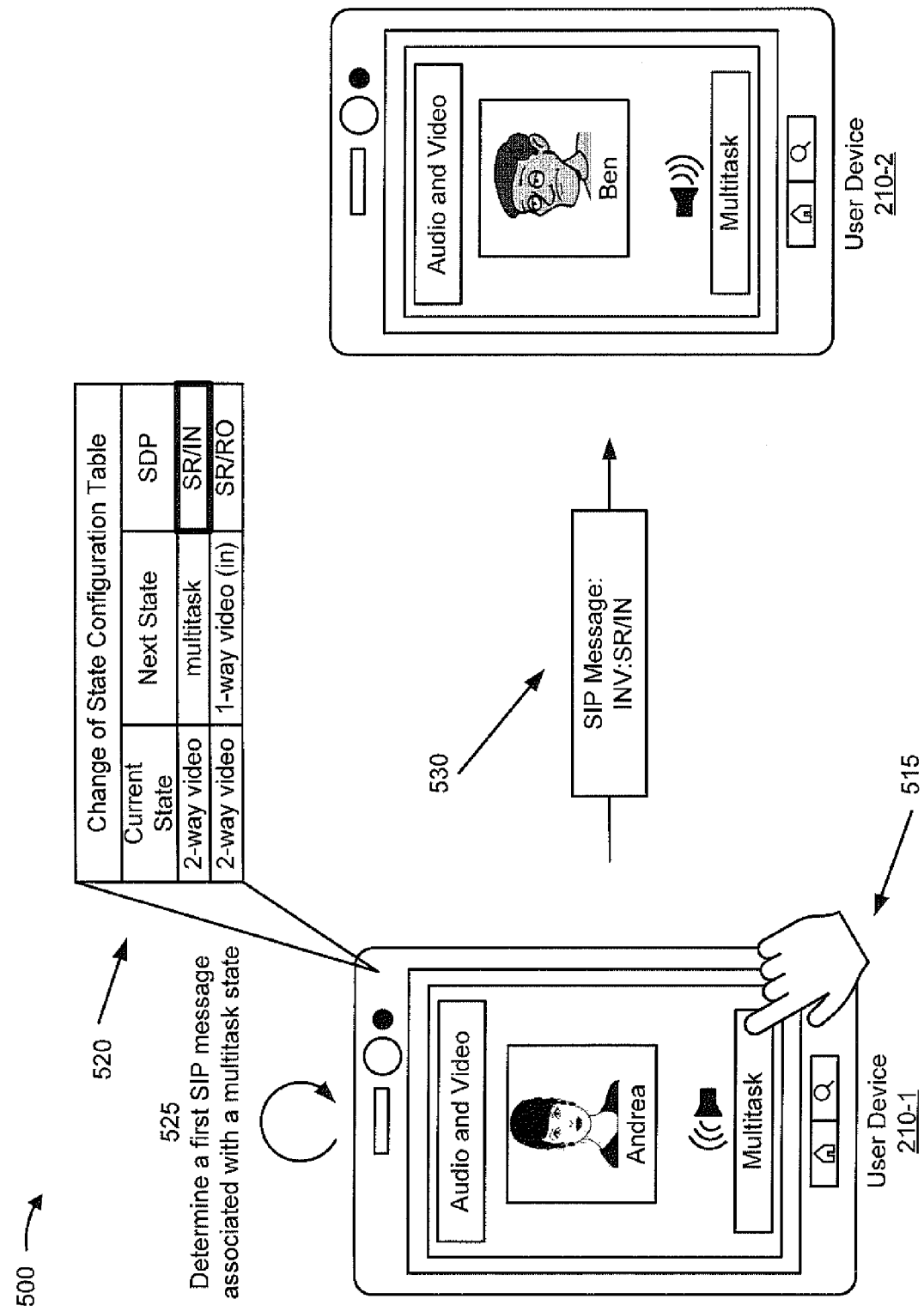

As shown in FIG. 5B, and by reference number 515, user interaction with a button indicates that user device 210-1 is to change state to a multitasking second state. As shown by reference number 520, user device 210-1 includes a data structure (e.g. "Change of State Configuration Table") storing a set of indicators of SDP information for particular changes of state (e.g., "2-way video" to "multitask" utilizes an "SR/IN" message, "2-way video" to "1-way video (in)" utilizes an "SR/RO" message, etc.). As shown by reference number 525, user device 210-1 determines a first SIP message for indicating the communication configuration associated with the change of state to the multitasking second state (e.g., based on accessing the data structure). As shown by reference number 530, user device 210-1 provides state information via the first SIP message (e.g., "INV: SR/IN" indicating that user device 210-1 is inviting a change of state for user device 210-1 that includes bidirectional audio communication and inactive video communication for user device 210-1) to user device 210-2.

Figure 5C:
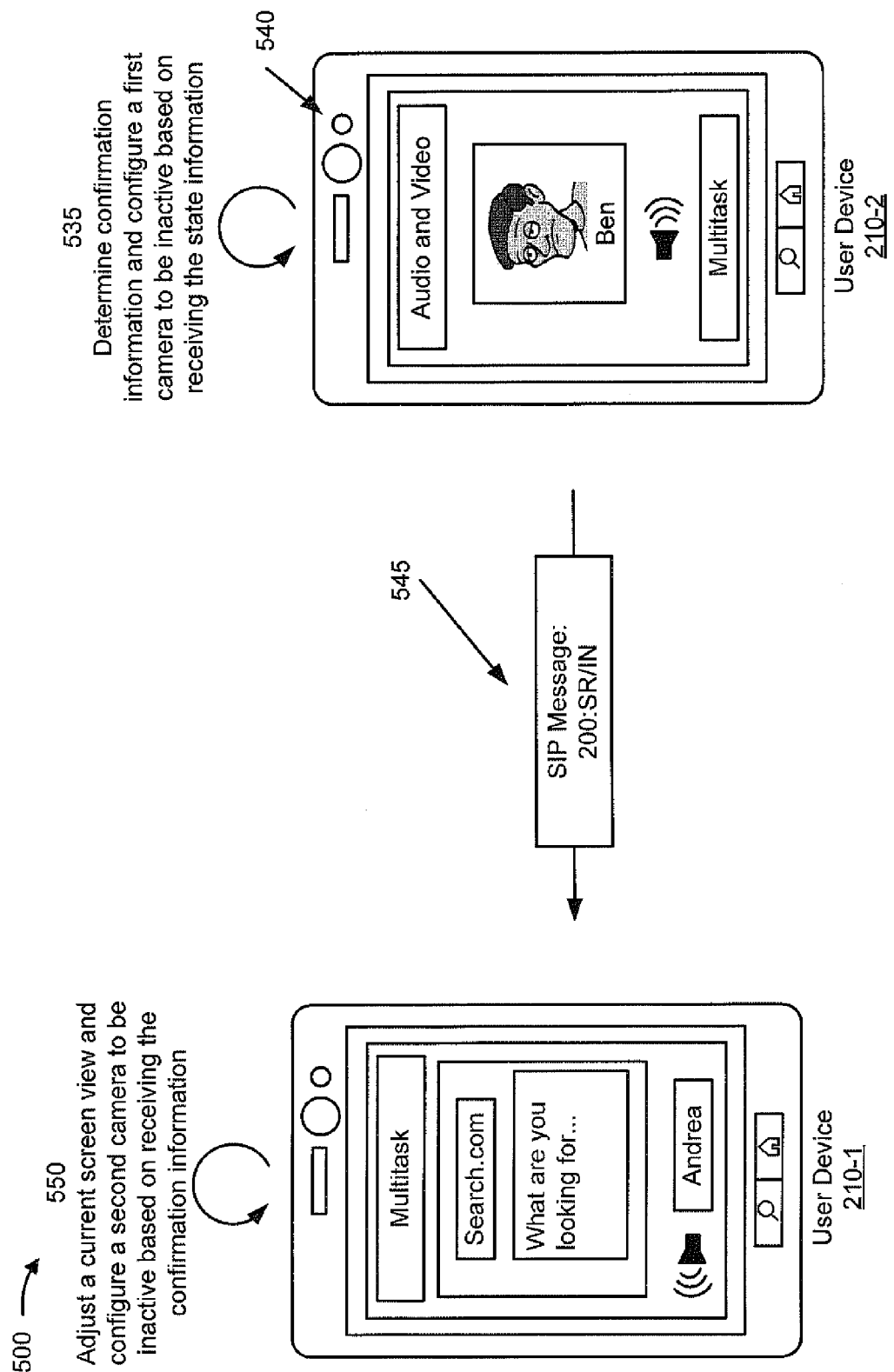

As shown in FIG. 5C, and by reference number 535, user device 210-2 determines confirmation information to be provided, and configures a first camera (e.g., a video camera associated with user device 210-2) to be inactive based on receiving the first SIP message from user device 210-1. As shown by reference number 540, an indicator associated with the first camera is deactivated to indicate to a user of user device 210-2 that video calling is not to be provided to user device 210-1. As shown by reference number 545, user device 210-2 provides a second SIP message including the confirmation information (e.g., "200: SR/IN" indicating that user device 210-2 is confirming a change of state for user device 210-2 that includes bidirectional audio communication and inactive video communication for user device 210-2) to user device 210-1. As shown by reference number 550, user device 210-1 adjusts a current screen view (e.g., to a "Search.com" screen view) and configures a second camera (e.g., a video camera associated with user device 210-1) to be inactive based on receiving the confirmation information via the second SIP message.

Figure 5D:
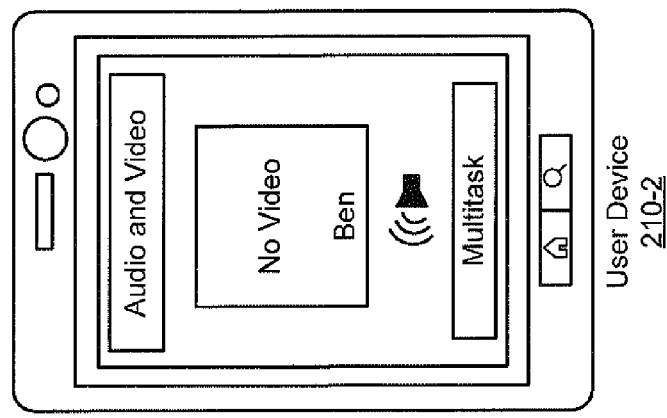
Figure 5D:
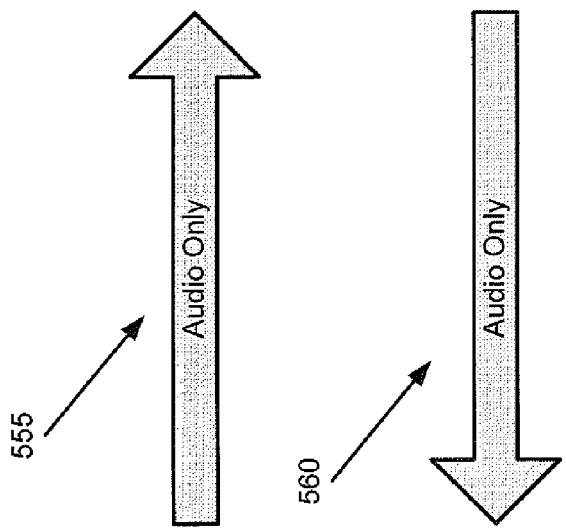
Figure 5D:
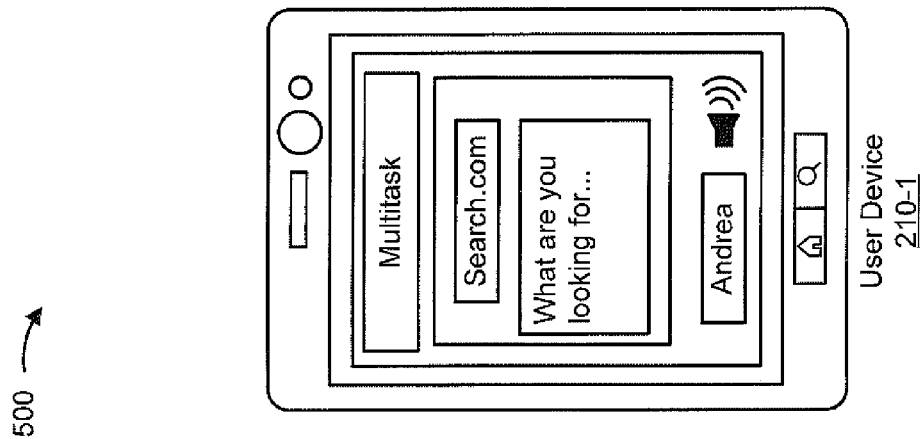

As shown in FIG. 5D, user device 210-1 is utilizing a screen view associated with a multitask state, and user device 210-2 is using a screen view associated with a video call state (e.g., with inactive video) based on the change of state. As shown by reference number 555, user device 210-1 is providing audio communication to user device 210-2, and as shown by reference number 560, user device 210-2 is providing audio communication to user device 210-1.

Figure 5E:
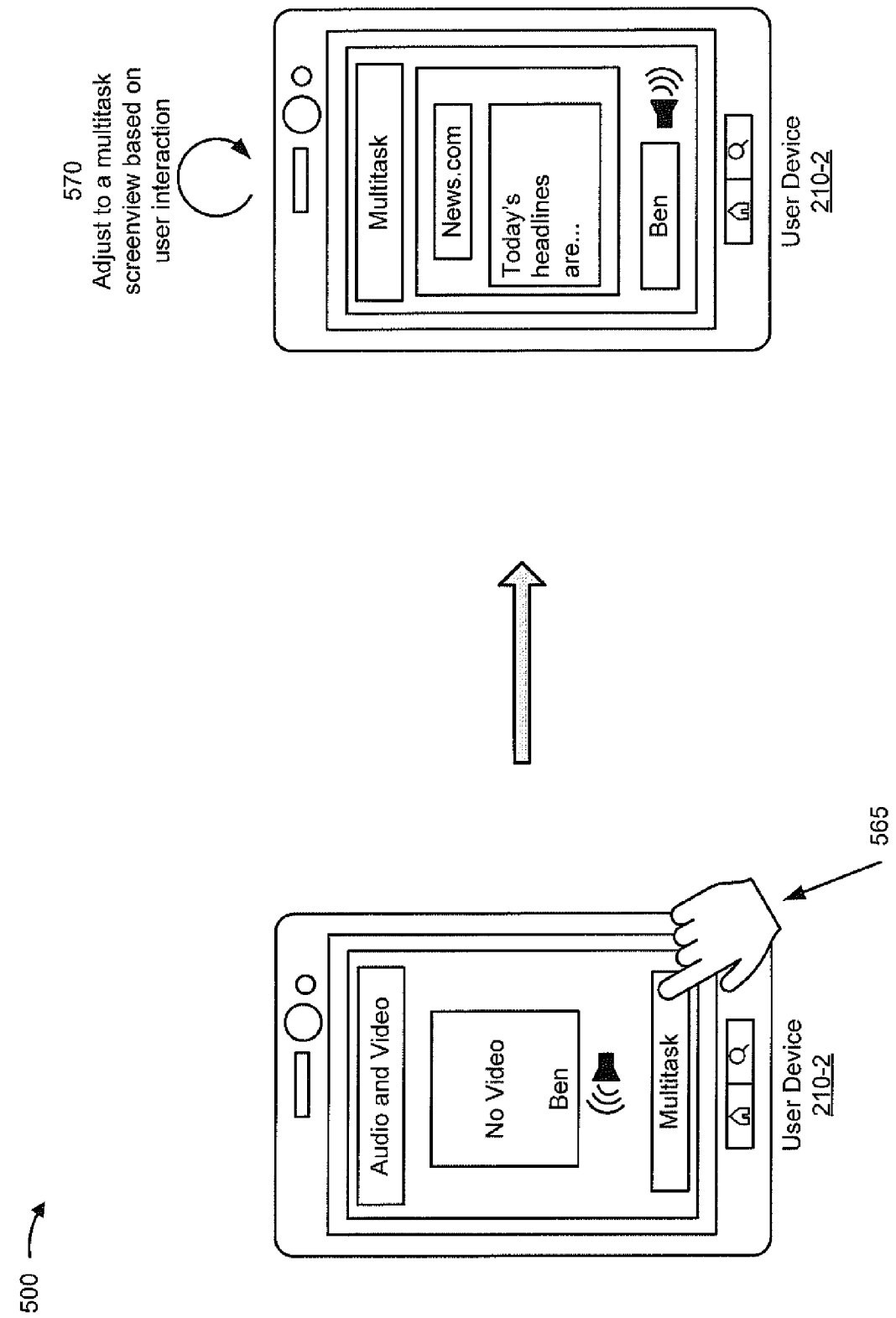

As shown in FIG. 5E, and by reference number 565, user interaction with a button indicates that user device 210-2 is to adjust to a multitasking state (e.g., a state associated with a multitask screen view). Assume that user device 210-2 determines not to provide state information to user device 210-1 based on determining that adjusting to the multitasking state does not include an adjustment to a communication configuration for user device 210-2. As shown by reference number 570, user device 210-2 adjusts the screen view to the multitask screen view (e.g., a "News.com" screen view) to provide the multitask call state for user device 210-2.

As indicated above, FIGS. 5A-5E are provided merely as an example. Other examples are possible and may differ from what was described with regard to FIGS. 5A-5E.

Figure 6A:
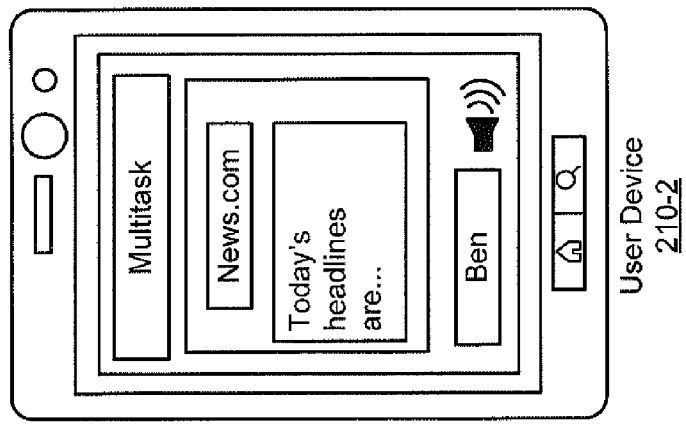
FIGS. 6A-6F are diagrams of another example implementation relating to the example process shown in FIG. 4.
Figure 6A:
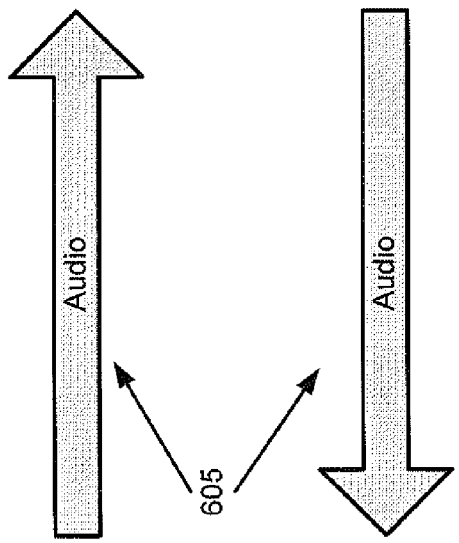
Figure 6A:
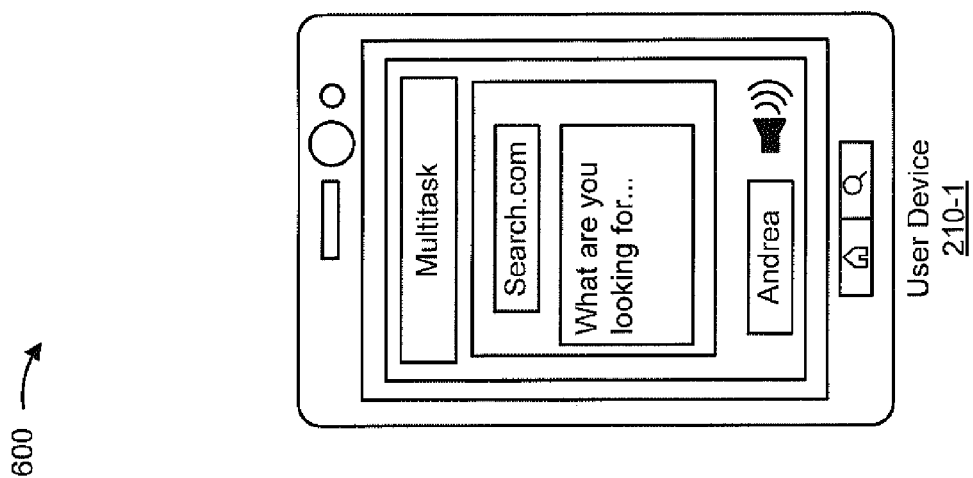

FIGS. 6A-6F are diagrams of an example implementation 600 relating to process 400 shown in FIG. 4. As shown in FIG. 6A, example implementation 600 includes user device 210-1 (e.g., utilizing a multitask state associated with a "Search.com" screen view) and user device 210-2 (e.g., utilizing a multitask state associated with a "News.com" screen view). As shown by reference number 605, user device 210-1 provides audio communication to user device 210-2 and user device 210-2 provides audio communication to user device 210-1.

Figure 6B:
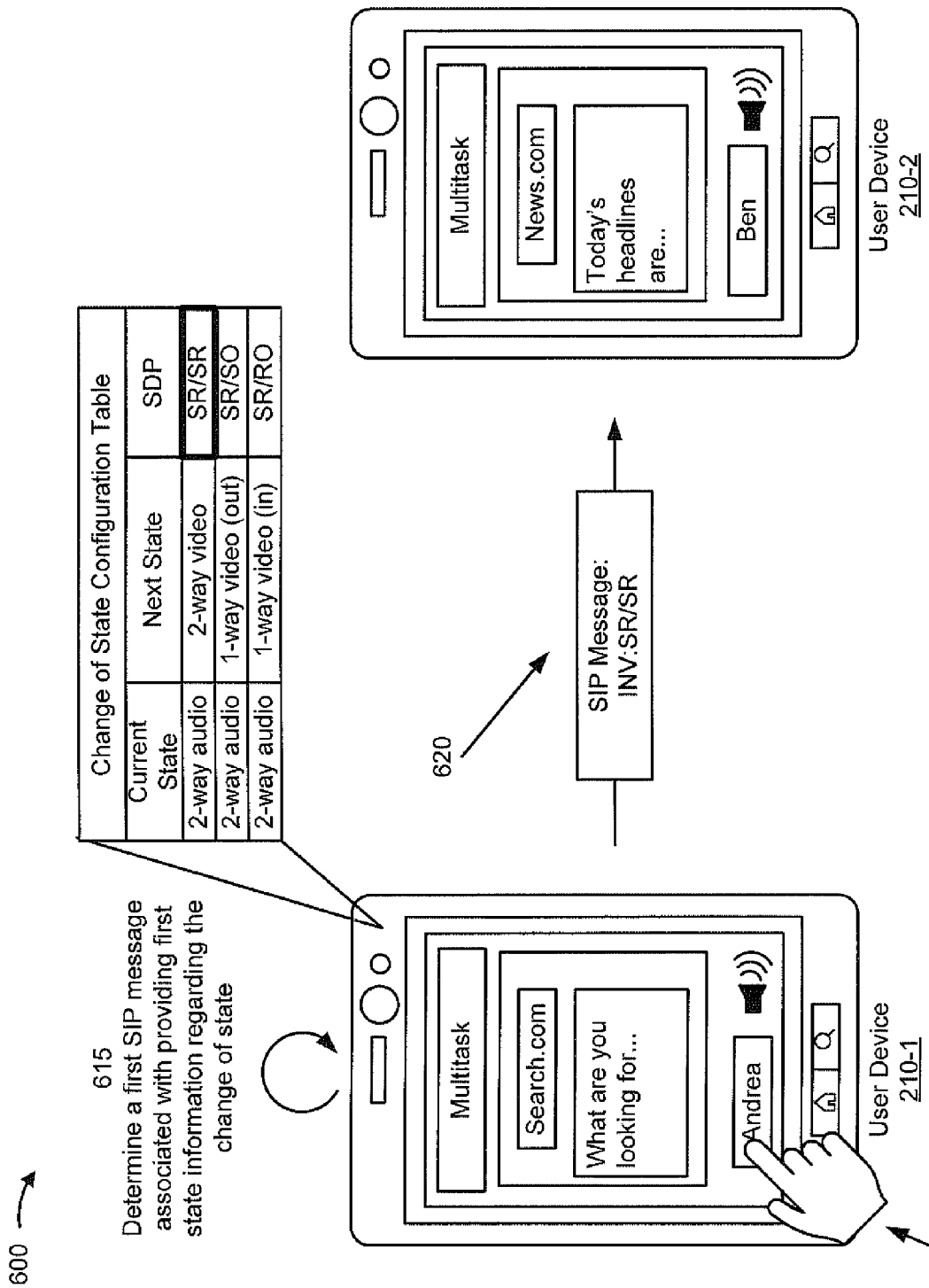

As shown in FIG. 6B, and by reference number 610, user interaction with a button indicates that user device 210-1 is to change state to a two-way video call state with user device 210-2. As shown by reference number 615, user device 210-1 determines a first SIP message associated with providing first state information regarding the change of state (e.g., identifying a communication configuration associated with the two-way video call state for user device 210-1) based on accessing a data structure (e.g., a "Change of State Configuration Table"). As shown by reference number 620, user device 210-1 provides the first SIP message (e.g., "INV: SR/SR," indicating that user device 210-1 is inviting a state that includes bidirectional audio communication and bidirectional video communication for user device 210-1) to user device 210-2.

Figure 6C:
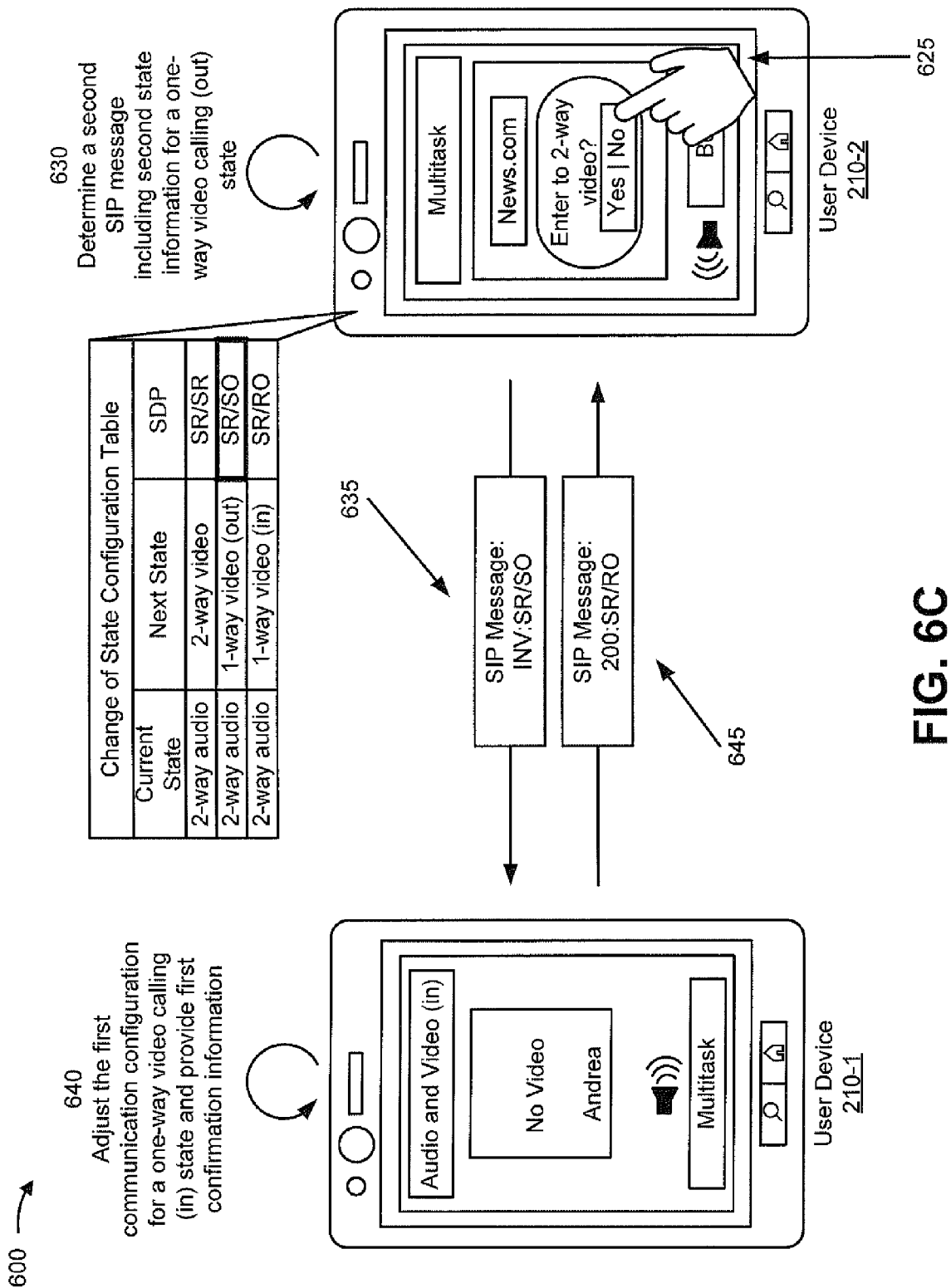

As shown in FIG. 6C, and by reference number 625, user interaction with a button indicates that user device 210-2 is not to adjust to a two-way video call state with user device 210-1. As shown by reference number 630, user device 210-2 determines a second SIP message associated with providing second state information regarding another change of state (e.g., identifying a particular communication configuration associated with a change of state to a one-way video call (out) state for user device 210-2). As shown by reference number 635, user device 210-1 receives the second SIP message (e.g., "INV: SR/SO," indicating that user device 210-2 is inviting a state that includes bidirectional audio communication and providing unidirectional video communication for user device 210-2). Assume that a user of user device 210-1 accepts the other change of state indicated by the second session description protocol message.

As further shown in FIG. 6C, and by reference number 640, user device 210-1 adjusts a first communication configuration (e.g., a particular communication configuration that is associated with user device 210-1) to facilitate a one-way video call (in) state (e.g., corresponding to the one-way video call (out) second state for user device 210-2) based on receiving the second SIP message from user device 210-2. User device 210-1 provides a third SIP message including confirmation information associated with confirming the other change of state determined by user device 210-2. As shown by reference number 645, user device 210-2 receives the third SIP message (e.g., "200: SR/RO," indicating that user device 210-1 is confirming the other change of state that includes bidirectional audio communication and receiving unidirectional video communication for user device 210-1). Assume that user device 210-2 adjusts a second communication configuration (e.g., a particular communication configuration that is associated with user device 210-2) to the one-way video call (out) second state based on receiving the confirmation information.

Figure 6D:
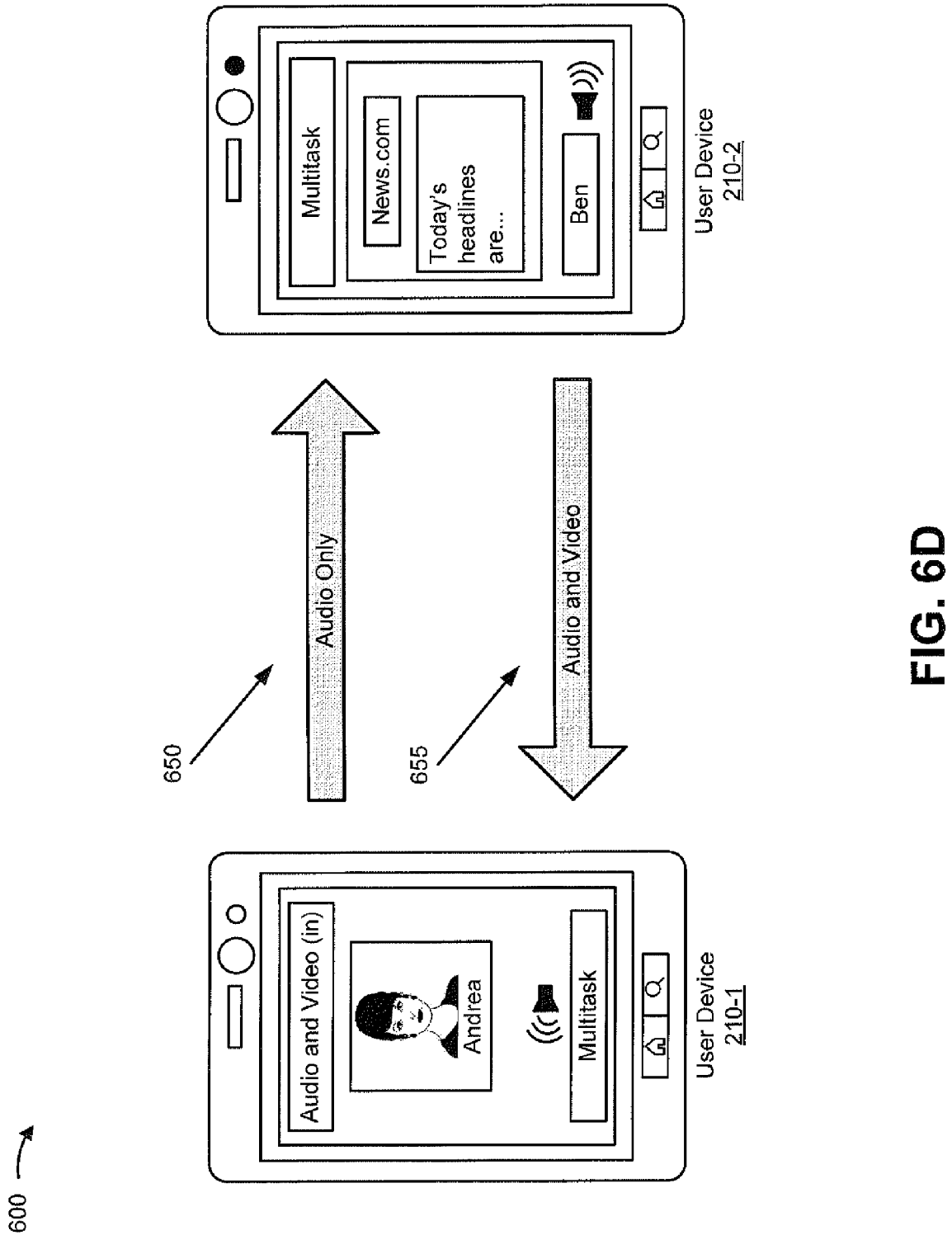

As shown in FIG. 6D, and by reference number 650, user device 210-1 provides audio communication to user device 210-2, and as shown by reference number 655, user device 210-2 provides audio and video communication to user device 210-1.

Figure 6E:
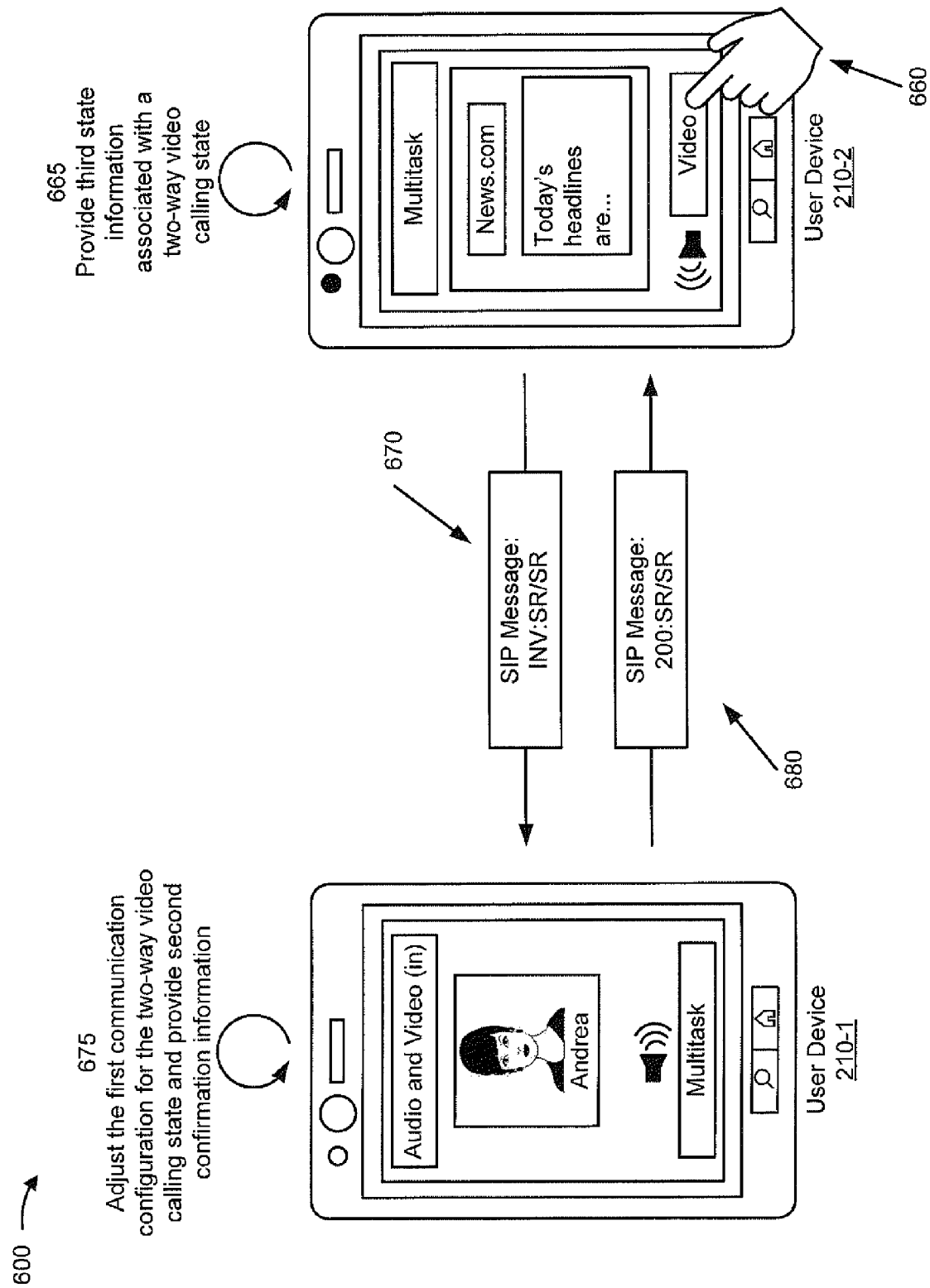

As shown in FIG. 6E, and by reference number 660, user interaction indicates that user device 210-2 is to change state to a two-way video call state with user device 210-1. As shown by reference number 665, user device 210-2 provides third state information associated with another change of state to the two-way video call state (e.g., via a fourth SIP message). As shown by reference number 670, user device 210-1 receives the fourth SIP message (e.g., "INV: SR/SR," indicating that user device 210-2 is inviting a state that includes bidirectional audio communication and bidirectional video communication for user device 210-2) from user device 210-2. Assume that user device 210-1 accepts the invited change of state, and as shown by reference number 675, user device 210-1 adjusts the first communication configuration to facilitate the two-way video call state. User device 210-1 provides second confirmation information (e.g., via a fifth SIP message), and as shown by reference number 680, user device 210-2 receives the fifth SIP message (e.g., "200: SR/SR," indicating that user device 210-1 is confirming a second state that includes bidirectional audio communication and bidirectional video communication for user device 210-1).

Figure 6F:
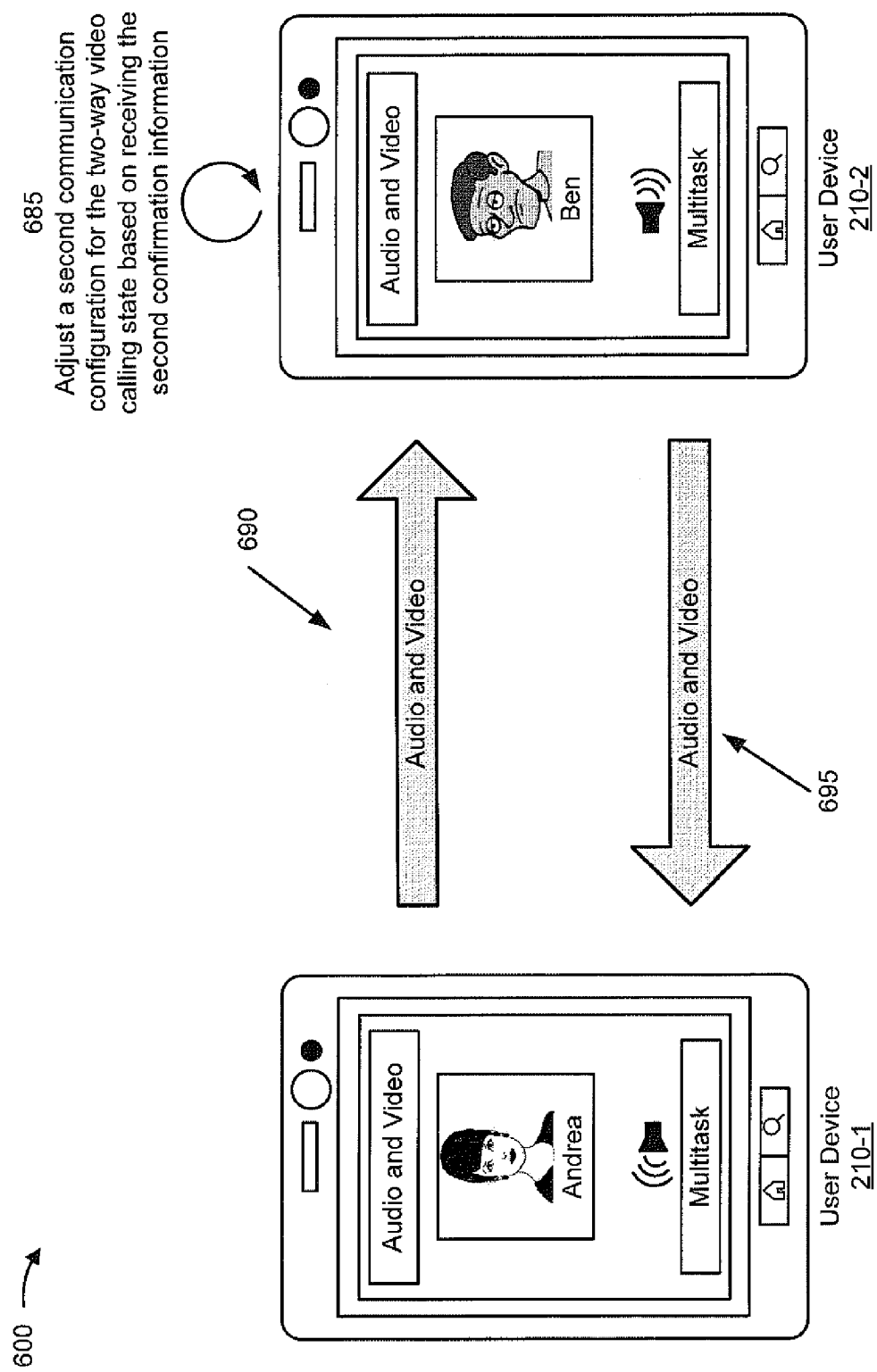

As shown in FIG. 6F, and by reference number 685, user device 210-2 adjusts the second communication configuration to facilitate the two-way video call second state based on receiving the second confirmation information from user device 210-1. As shown by reference number 690, user device 210-1 provides audio communication and video communication to user device 210-2, and as shown by reference number 695, user device 210-2 provides audio communication and video communication to user device 210-1 (e.g., user device 210-1 and user device 210-2 are utilizing two-way video call).

As indicated above, FIGS. 6A-6F are provided merely as an example. Other examples are possible and may differ from what was described with regard to FIGS. 6A-6F.

Figure 7A:
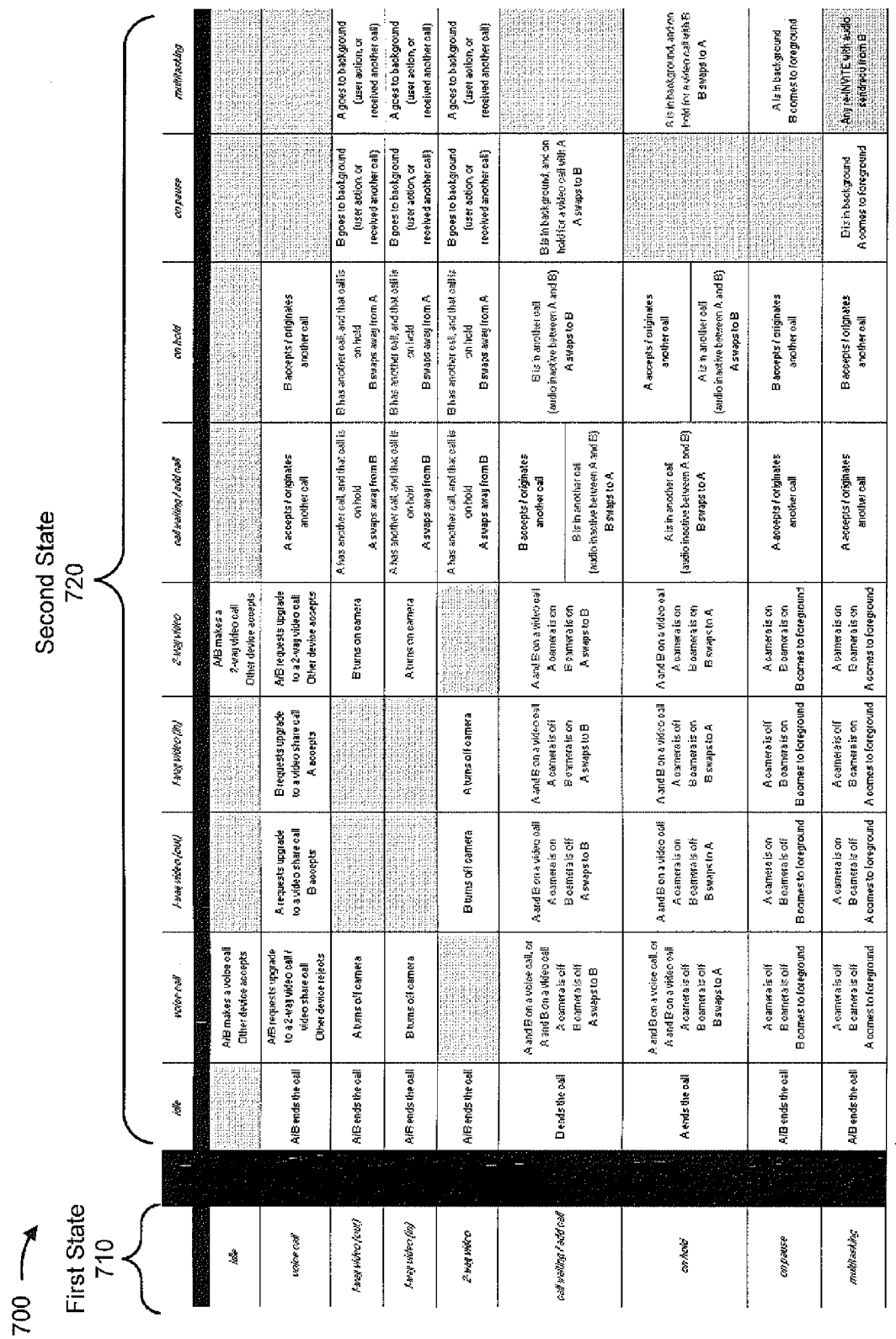
Figure 7B:
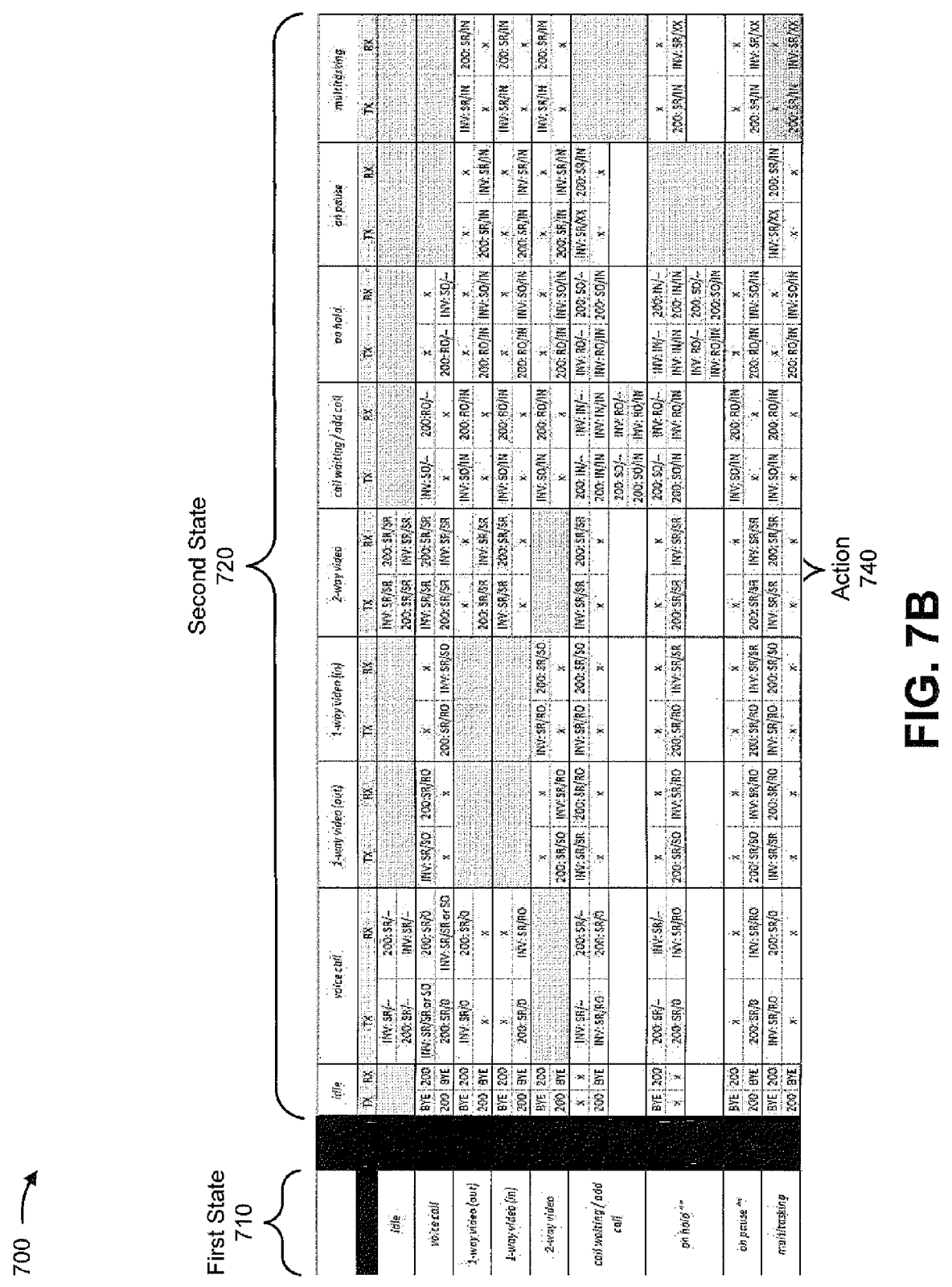

FIGS. 7A and 7B are diagrams of an example data structure 700 that stores state transition information associated with facilitating a change of state associated with a communication. Data structure 700 may be stored in a memory device (e.g., a RAM, a hard disk, etc.) associated with one or more devices and/or components of FIG. 2 and/or FIG. 3. For example, data structure 700 may be stored by user device 210-1 and/or user device 210-2.

As shown in FIG. 7A, data structure 700 may include a collection of fields, such as a first state field 710, a second state field 720, and an event field 730.

First state field 710 may store information that identifies a first state associated with user device 210-1 and/or user device 210-2. For example, first state field 710 may store information identifying a voice call first state, a one-way video (out) first state, or the like, using a string of characters (e.g., "voice call," "1-way video (out)," etc.), a state identifier, or the like.

Second state field 720 may store information that identifies a second state to which user device 210-1 and/or user device 210-2 is to transition. For example, second state field 720 may store information identifying an idle second state, a voice call second state, a one-way video (out) second state, or the like, using a string of characters (e.g., "idle," "voice call," "1-way video (out)," etc.), a state identifier, or the like.

Event field 730 may store information that identifies a set of audio and/or video configurations associated with a change from a first state (e.g., identified by first state field 710) to a second state 720 (e.g., identified by second state field 720). For example, event field 730 may store an audio configuration identifier, a video configuration identifier, a screen view identifier, or the like, using a string of characters (e.g., "A camera is off," "B, camera is off," or the like). In some implementations, event field 730 identifies an event that causes a transition from a first state to a second state.

In some implementations, event field 730 may be conceptually represented as an intersection of first state field 710 and second state field 720. For example, when changing state from a voice call first state to a two-way video call second state, event field 730 may indicate that user device 210-1 (e.g., "A") is to provide a request (e.g., to user device 210-2) to upgrade a call (e.g., an existing voice call communication) to a "2-way video call," and may indicate that user device 210-2 (e.g., "B") is to accept the request. Additionally, or alternatively, when changing state from the two-way video call first state to a multitasking second state, event field 730 may indicate that user device 210-1 is to switch from a video screen view associated with user device 210-2 to a multitask screen view (e.g., "A goes to background"), and may indicate that a transition from the two-way video call first state to the multitasking second state (e.g., identified by event field 730) is to be initiated based on a user action (e.g., user interaction with user device 210-1) and/or based on receiving another call (e.g., from user device 210-3). Additionally, or alternatively, when changing state from a one-way video (in) call first state to the two-way video call second state, event field 730 may indicate that user device 210-1 (e.g., "A") is to configure a camera to record video to be provided to user device 210-2 (e.g., "turns camera on").

As shown in FIG. 7B, data structure 700 may include another collection of fields, such as the first state field 710, the second state field 720, and an action field 740.

Action field 740 may store information that identifies a set of SIP messages including SDP information associated with signaling a transition from a first state (e.g., identified by first state field 710) to a second state (e.g., identified by second state field 720). For example, action field 740 may store information identifying an SIP message provided by user device 210-1 to user device 210-2 (e.g., "TX"), another SIP message provided by user device 210-2 to user device 210-1 (e.g., "RX"), or the like, using an SIP message content identifier, such as an SIP invite message content identifier (e.g., an SIP INV message including SDP information SR, SO, RO, etc.), an SIP confirmation message content identifier (e.g., an SIP 200 message including SDP information SR, SO, RO, etc.), or the like. In some implementations, action field 740 identifies an action taken by user device 210-1 and/or user device 210-2 to signal a state transition (e.g., after detecting an event identified in a corresponding event field 730).

In some implementations, action field 740 may be conceptually represented as an intersection between first state field 710 and second state field 720. For example, when changing state from a voice call first state to a two-way video call second state, action field 740 may indicate that this state change may be signaled based on user device 210-1 providing an INV: SR/SR SIP message to user device 210-2 and user device 210-2 providing a 200: SR/SR SIP message to user device 210-1. Additionally, or alternatively, action field 740 may indicate that this state change may be signaled based on user device 210-2 providing another INV: SR/SR SIP message to user device 210-1 and user device 210-1 providing another 200: SR/SR SIP message to user device 210-2. Additionally, or alternatively, when changing state from a two-way video call first state to a multitasking second state, action field 740 indicates that this state change may be signaled based on user device 210-1 providing an INV: SR/IN SIP message to user device 210-2 and user device 210-2 providing a 200: SR/IN SIP message to user device 210-1.

Data structure 700 includes fields 710-740 for explanatory purposes. In practice, data structure 700 may include additional fields, fewer fields, different fields, or differently arranged fields than those shown in FIGS. 7A and 7B and/or described herein with respect to data structure 700. Furthermore, while data structure 700 is represented as a state transition table with rows and columns, in practice data structure 700 may include any type of data structure, such as another table, a linked list, a tree, a hash table, a database, or any other type of data structure. In some implementations, data structure 700 may include information generated by a device and/or a component. Additionally, or alternatively, data structure 700 may include information provided from another source, such as information provided by a user and/or information automatically provided by a device.

Implementations described herein may assist a first user device in changing a state of a communication with a second user device via one or more SIP messages while the first user device is engaged in the communication with the second user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Similarly, as used herein, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
  determine to adjust from a first state for an existing communication between the device and another device,
    the first state being associated with utilizing a first audio and/or video configuration for the communication;
  determine a second state associated with a second audio and/or video configuration for the communication,
    the second audio and/or video configuration being different from the first audio and/or video configuration,
    the second audio and/or video configuration being associated with a call waiting state;
  provide state information associated with the second audio and/or video configuration via a first session initiation protocol message including first session description protocol information,
    the first session description protocol information including directionality information associated with the second audio and/or video configuration;
  receive confirmation information via a second session initiation protocol message including second session description protocol information based on providing the state information; and
  adjust from the first state to the second state, during the communication, based on receiving the confirmation information.

2. The device of claim 1, where the one or more processors, when determining to adjust from the first state, are to:
  receive other state information via another session initiation protocol message including other session description protocol information,
    the other session description protocol information including other directionality information associated with another audio and/or video configuration; and
  where the one or more processors, when determining the second state, are to:
    determine the second state based on receiving the other state information via the other session description initiation protocol message.

3. The device of claim 1, where the one or more processors are further to:
  receive user input indicating a particular state,
    the particular state being associated with a particular audio and/or video configuration; and
  where the one or more processors, when determining the second state, are further to:
    determine the second state based on receiving the user input indicating the particular state.

4. The device of claim 1, where the one or more processors, when receiving the confirmation information via the second session initiation protocol message, are to:
  determine another audio and/or video configuration based on the confirmation information; and
  where the one or more processors, when adjusting from the first state to the second state, are to:
    adjust from the first state to the second state based on determining the other audio and/or video configuration.

5. The device of claim 1, where the one or more processors are further to:
  determine a particular screen view associated with the second state,
    the particular screen view associated with the second state being different from another particular screen view associated with the first state; and
  where the one or more processors, when adjusting from the first state to the second state, are to:
    utilize the particular screen view associated with the second state.

6. The device of claim 1, where the one or more processors, are further to:
  receive other confirmation information via a third session initiation protocol message;
  determine to adjust to a two-way video call state based on receiving the other confirmation information;
  activate a screen view associated with the two-way video call state;
  provide, via the screen view, video received via an input interface;
  activate a camera associated with the two-way video call state; and
  provide video, captured from the camera, via an output interface.

7. The device of claim 1, where the one or more processors are further to:
  access a data structure storing a set of session description protocol identifiers,
    the set of session description protocol identifiers describing a set of audio and/or video configurations,
    the set of audio and/or video configurations including the second audio and/or video configuration;
  determine a particular session description protocol identifier associated with the second audio and/or video configuration; and
  generate the first session initiation protocol message based on determining the particular session description protocol identifier.

8. A computer-readable medium storing instructions, the instructions comprising:
  one or more instructions that, when executed by one or more processors, cause the one or more processors to:

receive, via a first message, state information associated with inviting an adjustment to a communication state of an existing communication between a first device and a second device,
  the state information including information identifying a first audio and/or video configuration;
determine that the first audio and/or video configuration is associated with a call waiting state;
determine a second audio and/or video configuration based on the first audio and/or video configuration;
generate confirmation information based on determining that the first audio and/or video configuration is associated with the call waiting state,
  the confirmation information being associated with the second audio and/or video configuration;
provide the confirmation information, via a second message, based on receiving the state information; and
adjust the communication state, during the communication between the first device and the second device, based on providing the confirmation information.

9. The computer-readable medium of claim 8, where the one or more instructions, when executed by the one or more processors, further cause the one or more processors to:
provide an indication of the state information;
receive user feedback based on providing the indication of the state information; and
where the one or more instructions, that cause the one or more processors to determine the confirmation information, cause the one or more processors to:
  determine the confirmation information based on receiving the user feedback.

10. The computer-readable medium of claim 8, where the one or more instructions, that cause the one or more processors to receive the state information, cause the one or more processors to:
access a data structure storing a set of session description protocol confirmation messages,
  the set of session description protocol confirmation messages including a particular message associated with describing the second audio and/or video configuration;
identify the particular message associated with describing the second audio and/or video configuration; and
where the one or more instructions, that cause the one or more processors to provide the confirmation information via the second message, cause the one or more processors to:
  provide the confirmation information based on identifying the particular message.

11. The computer-readable medium of claim 8, where the one or more instructions, further cause the one or more processors to:
receive other state information via a third message;
provide other confirmation information associated with identifying a two-way video calling state based on the other state information; and
adjust the communication state to the two-way video calling state.

12. The computer-readable medium of claim 8, where the one or more instructions, when executed by the one or more processors, further cause the one or more processors to:
determine a particular screen view associated with the second audio and/or video configuration; and
where the one or more instructions, that cause the one or more processors to adjust the communication state, cause the one or more processors to:
  adjust a current screen view associated with the first audio and/or video configuration based on determining the particular screen view associated with the second audio and/or video configuration.

13. The computer-readable medium of claim 8, where the one or more instructions, when executed by the one or more processors, further cause the one or more processors to:
receive information indicating that an interface associated with providing video communication is to be used for another task; and
where the one or more instructions, that cause the one or more processors to provide the confirmation information, further cause the one or more processors to:
  provide confirmation information identifying a multi-task state; and
  provide a user indication that the interface is to be used for the other task.

14. The computer-readable medium of claim 8, where the one or more instructions, when executed by the one or more processors to generate the confirmation information, cause the one or more processors to:
generate the confirmation information, associated with an on-hold state, based on determining that the first audio and/or video configuring is associated with the call waiting state; and
where the one or more instructions, that cause the one or more processors to adjust the communication state, cause the one or more processors to:
  adjust the communication state to the on-hold state.

15. A method, comprising:
utilizing, by a first device, a first audio and/or video configuration for audio and/or video communication for an existing communication between the first device and a second device;
determining, by the first device, to change state from the first audio and/or video configuration to a second audio and/or video configuration,
  the second audio and/or video configuration being different from the first audio and/or video configuration,
  the second audio and/or video configuration being associated with a call waiting state;
providing, by the first device, state information associated with changing the state to the second audio and/or video configuration via a session initiation protocol message,
  the session initiation protocol message including session description protocol information identifying the second audio and/or video configuration;
utilizing, by the first device, the second audio and/or video configuration for audio and/or video communication during the communication between the first device and the second device based on providing the state information.

16. The method of claim 15, where utilizing the second audio and/or video configuration for audio and/or video communication comprises:
adjusting utilization of a camera based on the first audio and/or video configuration and the second audio and/or video configuration.

17. The method of claim 15, where utilizing the second audio and/or video configuration for audio and/or video communication comprises:
adjusting utilization of a microphone based on the first audio and/or video configuration and the second audio and/or video configuration.

18. The method of claim 15, further comprising:
receiving confirmation information via another session initiation protocol message based on providing the state information; and
where utilizing the second audio and/or video configuration for audio and/or video communication, comprises:
   utilizing the second audio and/or video configuration for audio and/or video communication based on receiving the confirmation information.

19. The method of claim 15, further comprising:
determining a particular session description protocol identifier associated with describing an audio and/or video directionality of the second audio and/or video configuration; and
where providing the state information comprises:
   providing the state information based on determining the particular session description protocol identifier.

20. The method of claim 15, further comprising:
receiving a user indication of a particular adjustment to the first audio and/or video configuration,
   the particular adjustment being associated with utilizing the second audio and/or video configuration; and
where determining to change state from the first audio and/or video configuration to the second audio and/or video configuration comprises:
determining to change state from the first audio and/or video configuration to the second audio and/or video configuration based on receiving the user indication of the particular adjustment to the first audio and/or video configuration.

* * * * *